US011227010B1

United States Patent
Vieira De Souza et al.

(10) Patent No.: US 11,227,010 B1
(45) Date of Patent: Jan. 18, 2022

(54) SYSTEM AND METHOD FOR CREATING, MANAGING, AND DISPLAYING USER OWNED COLLECTIONS OF 3D DIGITAL COLLECTIBLES

(71) Applicant: Dapper Labs Inc., Vancouver (CA)

(72) Inventors: Arthur Camara Vieira De Souza, Vancouver (CA); Raymond Huynh, Vancouver (CA)

(73) Assignee: Dapper Labs Inc., Vancouver (CA)

( * ) Notice: Subject to any disclaimer, the term of this patent is extended or adjusted under 35 U.S.C. 154(b) by 0 days.

(21) Appl. No.: 17/306,185

(22) Filed: May 3, 2021

(51) Int. Cl.
*G06F 3/0481* (2013.01)
*G06F 16/74* (2019.01)
*G06F 16/738* (2019.01)

(52) U.S. Cl.
CPC ........ *G06F 16/743* (2019.01); *G06F 3/04815* (2013.01); *G06F 3/04817* (2013.01); *G06F 16/738* (2019.01)

(58) Field of Classification Search
CPC .. G06F 16/743; G06F 16/738; G06F 3/04815; G06F 3/04817
See application file for complete search history.

(56) References Cited

U.S. PATENT DOCUMENTS

| | | |
|---|---|---|
| 3,467,382 A | 9/1969 | Hall |
| 5,515,486 A | 5/1996 | Amro |
| 5,678,015 A | 10/1997 | Goh |
| 5,808,663 A | 9/1998 | Okaya |
| 5,898,435 A | 4/1999 | Nagahara |
| 6,094,237 A | 7/2000 | Hashimoto |
| 6,774,914 B1 | 8/2004 | Benayoun |
| D576,635 S | 9/2008 | Nathan |
| 7,730,059 B2 | 6/2010 | Behnen |
| D623,657 S | 9/2010 | Fitzmaurice |
| 7,957,061 B1 | 6/2011 | Connor |
| 8,510,680 B2 | 8/2013 | Kang |
| D690,310 S | 9/2013 | Brinda |
| 8,613,018 B2 | 12/2013 | Kim |
| 8,681,105 B2 | 3/2014 | Huh |

(Continued)

OTHER PUBLICATIONS

"Rarity", downloaded from <URL: https://mtg.fandom.com/wiki/Rarity>, available online Aug. 23, 2020 (Year: 2020), 2 pages.

(Continued)

*Primary Examiner* — Beau D Spratt
(74) *Attorney, Agent, or Firm* — Sheppard Mullin Richter & Hampton LLP

(57) ABSTRACT

A system and method for creating, managing, and displaying collections of 3D digital collectibles comprising a virtual, three dimensional, n-sided structure including a digital media file or set of digital media files representing an event rendered on a representation of a first surface thereof, and data relating to the event rendered on at least a second surface thereof, where the digital media file may be a video clip of the event that can be played automatically via a media player associated with the display. The system may provide a graphical user interface that displays a set of user tools to create the collections by selecting individual 3D digital collectibles, and a user interface to display collections to other users and serially play the digital media files of the 3D digital collectibles of the collection.

35 Claims, 16 Drawing Sheets

(56) References Cited

U.S. PATENT DOCUMENTS

| | | | |
|---|---|---|---|
| D712,910 S | 9/2014 | Liao | |
| 8,836,863 B2 | 9/2014 | Hwang | |
| 8,943,541 B2 | 1/2015 | Marlow | |
| 9,152,695 B2 | 10/2015 | Tibrewal | |
| 9,304,655 B2 | 4/2016 | Sinha | |
| 9,360,991 B2 | 6/2016 | Celebisoy | |
| 9,626,724 B2 | 4/2017 | Tatham | |
| 9,762,757 B2 | 9/2017 | Kim | |
| 9,766,722 B2 | 9/2017 | Park | |
| 9,911,395 B1 | 3/2018 | Townsend | |
| 10,007,393 B2 | 6/2018 | King | |
| D829,228 S | 9/2018 | Wo | |
| D845,340 S | 4/2019 | Wu | |
| 10,289,972 B1 | 5/2019 | Goyal | |
| 10,474,242 B2 | 11/2019 | Yin | |
| 10,625,163 B1 | 4/2020 | Hsu | |
| D888,761 S | 6/2020 | Pazmino | |
| 10,712,898 B2 | 7/2020 | Christmas | |
| 10,712,923 B1* | 7/2020 | Pathmanathan | G06F 3/04847 |
| D910,067 S | 2/2021 | Kim | |
| D916,902 S | 4/2021 | Pazmino | |
| 10,983,680 B2 | 4/2021 | Kuribayashi | |
| 10,984,606 B1 | 4/2021 | Dalmia | |
| 11,037,410 B2 | 6/2021 | Pilnock | |
| 11,099,709 B1 | 8/2021 | McNeil | |
| 2002/0069415 A1 | 6/2002 | Humbard | |
| 2002/0184260 A1 | 12/2002 | Martin | |
| 2003/0134563 A1 | 7/2003 | Gray | |
| 2003/0142136 A1 | 7/2003 | Carter | |
| 2005/0289590 A1 | 12/2005 | Cheok | |
| 2007/0186186 A1 | 8/2007 | Both | |
| 2007/0241016 A1 | 10/2007 | Piczon | |
| 2009/0256780 A1* | 10/2009 | Small | H04N 1/00458 345/55 |
| 2010/0058248 A1 | 3/2010 | Park | |
| 2010/0169836 A1 | 7/2010 | Stallings | |
| 2010/0309228 A1 | 12/2010 | Mattos | |
| 2011/0022988 A1 | 1/2011 | Lee | |
| 2011/0096006 A1 | 4/2011 | Jeong | |
| 2011/0261171 A1 | 10/2011 | Otsuka | |
| 2011/0307834 A1 | 12/2011 | Wu | |
| 2011/0310100 A1 | 12/2011 | Adimatyam | |
| 2011/0316972 A1 | 12/2011 | Demas | |
| 2012/0032958 A1 | 2/2012 | Werline | |
| 2012/0038754 A1 | 2/2012 | Na | |
| 2012/0090005 A1 | 4/2012 | Marlow | |
| 2012/0115606 A1 | 5/2012 | Seelig | |
| 2012/0179672 A1 | 7/2012 | Van Wie | |
| 2012/0200495 A1 | 8/2012 | Johansson | |
| 2012/0313933 A1 | 12/2012 | Tsukagoshi | |
| 2013/0174035 A1 | 7/2013 | Grab | |
| 2013/0182072 A1 | 7/2013 | Seo | |
| 2013/0263059 A1 | 10/2013 | Amoraga Rodriguez | |
| 2013/0346911 A1 | 12/2013 | Sripada | |
| 2014/0028674 A1* | 1/2014 | Eldin | G06T 15/04 345/420 |
| 2014/0033078 A1 | 1/2014 | Goldman | |
| 2014/0137020 A1 | 5/2014 | Sharma | |
| 2014/0258938 A1 | 9/2014 | Christmas | |
| 2014/0337321 A1 | 11/2014 | Coyote | |
| 2014/0337792 A1 | 11/2014 | Phang | |
| 2014/0337915 A1 | 11/2014 | Kanee | |
| 2015/0011298 A1 | 1/2015 | Haid | |
| 2015/0019986 A1* | 1/2015 | White | G06F 16/26 715/744 |
| 2015/0067603 A1 | 3/2015 | Tanaka | |
| 2015/0160824 A1* | 6/2015 | White | G06F 3/04815 715/849 |
| 2015/0245014 A1 | 8/2015 | Guo | |
| 2015/0268831 A1 | 9/2015 | Sripada | |
| 2015/0324886 A1 | 11/2015 | Hurst | |
| 2016/0179314 A9 | 6/2016 | Ku | |
| 2016/0180449 A1* | 6/2016 | Naware | G06Q 30/0643 705/27.2 |
| 2017/0003851 A1 | 1/2017 | Moore | |
| 2017/0046042 A1 | 2/2017 | Gotcher | |
| 2017/0078654 A1 | 3/2017 | Facin | |
| 2017/0151484 A1 | 6/2017 | Reilly | |
| 2018/0061363 A1 | 3/2018 | Lee | |
| 2018/0188831 A1 | 7/2018 | Lyons | |
| 2018/0190003 A1 | 7/2018 | Upadhyay | |
| 2018/0213950 A1 | 8/2018 | Millman | |
| 2018/0220102 A1 | 8/2018 | Pino | |
| 2019/0073705 A1 | 3/2019 | Brown | |
| 2019/0113358 A1 | 4/2019 | Moriyasu | |
| 2019/0132575 A1 | 5/2019 | Izumi | |
| 2019/0139296 A1 | 5/2019 | Lakshman | |
| 2019/0199995 A1 | 6/2019 | Yip | |
| 2019/0304160 A1 | 10/2019 | Izumi | |
| 2019/0379876 A1 | 12/2019 | Hur | |
| 2020/0005284 A1 | 1/2020 | Vijayan | |
| 2020/0020024 A1 | 1/2020 | Lyons | |
| 2020/0021668 A1 | 1/2020 | Lyons | |
| 2020/0037943 A1 | 2/2020 | Chaja | |
| 2020/0050855 A1 | 2/2020 | Jabara | |
| 2020/0066047 A1 | 2/2020 | Karalis | |
| 2020/0090303 A1 | 3/2020 | Zhang | |
| 2020/0092406 A1 | 3/2020 | Diamond | |
| 2020/0098279 A1 | 3/2020 | Al-Khalifa | |
| 2020/0142579 A1 | 5/2020 | Shigeta | |
| 2020/0159394 A1 | 5/2020 | Chassen | |
| 2020/0179759 A1 | 6/2020 | Kubota | |
| 2020/0279438 A1 | 9/2020 | Ohashi | |
| 2020/0329266 A1 | 10/2020 | Takaku | |
| 2020/0353362 A1 | 11/2020 | Sachson | |
| 2021/0001231 A1 | 1/2021 | Kurabayashi | |
| 2021/0035415 A1 | 2/2021 | Pilnock | |
| 2021/0120982 A1 | 4/2021 | Spiro | |
| 2021/0192651 A1 | 6/2021 | Groth | |
| 2021/0232750 A1 | 7/2021 | Gray | |

OTHER PUBLICATIONS

Febrero, Pedro, "Dapper Labs Founder Discusses CryptoKitties and Digital Collectibles", downloaded from <URL: https://coinrivet.com/it/dapper-labs-founder-discusses-cryptokitties-and-digital-collectibles/>, posted online on Nov. 18, 2019 (Year: 2019), 6 pages.

Hughes, Jonathan E., "Demand for Rarity: Evidence from a Collectible Good", downloaded from <URL: https://spot.colorado.edu/~jonathug/Jonathan_E._Hughes/Main_files/Rarity_latest.pdf>, (Year: 2021), 34 pages.

NBA, "NBA's Top 100 Plays of the Decade", downloaded from <URL: https://www.youtube.com/watch?w=t22flliJLTQ>, posted Jan. 1, 2020 (Year: 2020), 2 pages.

PSA Blog, "Factors That Impact Trading Card Value", downloaded from <URL: https://blog.psacard.com/2020/05/14/factors-that-impact-trading-card-value/>, posted May 14, 2020 (Year: 2020), 4 pages.

Roham's Twitter, downloaded from <URL: https://twitter.com/rohamg/status/1156583602278273025?ref_src=twsrc%5Etfw%7Ctwcamp%5Etweetembed%7Ctwterm%5E1156583602278273025%7Ctwgr%5E%7Ctwcon%5Es1_&ref_url=https%3A%2F%2Fcoinrivet.com%2Fit%2Fdapper-labs-founder-discusses-cryptokitties-and-digital-collectibles%2F>, Jul. 2, 2019 (Year: 2019), 3 pages.

Wealthsimple, "How to Buy Fleeting Moments in Sports History", Wealthsimple Magazine, Nov. 27, 2020 (Year: 2020), 14 pages.

* cited by examiner

SYSTEM AND METHOD FOR CREATING, MANAGING, AND DISPLAYING USER OWNED COLLECTIONS OF 3D DIGITAL COLLECTIBLES

FIELD OF THE INVENTION

The field of the invention relates to a system and method for creating, managing, and displaying collections of 3D digital collectibles of sports plays or other events and a graphical user interface that displays a set of user tools to enable a user to interact with the collections and 3D digital collectibles.

BACKGROUND OF THE INVENTION

Physical collectibles, such as baseball cards, are known. Recently, digital collectibles have also been developed. However, the technology related to such digital collectibles is limited. For example, known digital collectibles are static, two-dimensional, images. These and other technical limitations and drawbacks exist with known collectibles.

BRIEF SUMMARY OF THE INVENTION

According to an aspect of the invention, there is provided a system and method for creating, managing, and displaying collections of 3D digital collectibles of sports plays or other events and a graphical user interface that provides an interactive display element for 3D digital collectibles and a set of user tools to interact with the 3D digital collectibles associated with a user account. The 3D digital collectible may include a 3D virtual display element comprising a virtual, three dimensional, n-sided structure including a digital media file or set of digital media files representing an event rendered on a representation of a first surface thereof, and data relating to the event rendered on a second surface thereof, where the digital media file may be a video clip of the event that can be played automatically via a media player associated with the display.

According to other aspects of the invention, the graphical user interface may include a display portion that includes a set of user tools to enable a user to interact with the 3D digital collectibles to create, manage and share user selected collections of 3D digital collectibles.

According to other aspects of various embodiments, a user may manage the display of multiple digital collectables within their account. For example, in some embodiments, the digital collectables may be stored online (e.g., under control of the system), a user may create one or more collections of digital collectables and share a link or other identifier associated with the collection and other users may use the link or other identifier to view the collection(s).

To facilitate the management of collections, the system may provide a set of graphical user interfaces. A first graphical user interface may include collection creation display that enables a user to select a set of the user's collectables to include in the collection, name the collection and upon completion click an icon to share the collection. The first graphical user interface may include a first display portion, that when selected by a user causes a second graphical user interface or second display portion (collectively "second display element") that includes a template to facilitate the ability for a user to select the desired digital collectables and arrange them in a desired order. The second display element may include a graphical depiction or layout of a predetermined number of slots for receiving digital collectables so that a user can select a collectable for one or more slots, such as from a pop-up list activated by interaction with a slot, drag and drop, or any other selection method, and specify an order. Once the user selects the desired digital collectables and arranges them in a desired order, the user may select save or otherwise indicate that they are finished making selections. The user may then be returned to the first graphical user interface and click an icon to share the collection via one or more predetermined channels and/or otherwise share a link or other identifier to enable others to view the collection(s). The user may create, separately name and share multiple collections with different collectables and/or combinations thereof.

The system may include a collections management module that comprises computer code for generating the displays described herein, cause the user's selection of collectables and the specified order to be stored in memory in association with a collection name and/or store other information relation to a collection. The collections management module may also include computer code that s configured to display a collection to a second user when the second user selects the link or other identifier associated with a first user's collection.

In some embodiments, when a second user selects the link or other identifier associated with a first user's collection, the collections management module generates a collectables display interface. The collections management module may display the collection, including each of the digital collectables included in the collection. According to one option, the second user may select individual ones of the digital collectables for display. According to another option, the collections management module may instruct a media player to automatically play, in the collectables display interface, the media files of the digital collectables included in the collection. The collections management module may be configured via software to cause the digital media files of the digital collectables included in the collection to be automatically displayed sequentially or may stitch the files together to create a single media file including each of the digital media files of the digital collectables included in the collection.

According to other aspects of some embodiments, the collections management module may cause the collectables display interface to sequentially display each of the digital collectables and then the media files of the digital collectables included in the collection.

The interactive display may provide a graphical user interface with a set of user tools to interact with the 3D digital collectibles. For example, in response to user input selections via the graphical user interface different surfaces of the n-sided display may be selectively displayed based on the user input. For example, the user may use the displayed tools to view and rotate the cube to see different tools. The GUI may present options for a user to rotate the cube in one or more directions.

According to an aspect of the invention, the interactive display includes a graphical user interface for displaying a 3D virtual display representing a digital collectable comprising content including a digital media file and data relating to the digital media file. The system may generate a graphical user interface display comprising a first display portion and a second display portion, the first display portion configured to display content associated with a selected surface of a 3D virtual display element comprising n-surfaces, the second display portion displaying a set of n icons, each representing a depiction of one of the surfaces and in response to a selection of one of the icons, cause the first display portion to display content associated with the selected surface.

The above stated aspects, as well as other aspects, features and advantages of the invention will become clear to those skilled in the art upon review of the following description. It should be understood that the description and specific examples, while describing several exemplary embodiments, are intended for purposes of illustration only and are not intended to limit the scope of the disclosure.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Figure 1A:
FIGS. 1a-1e show a 3D digital collectible according to some embodiments of the invention.

Exemplary embodiments of the invention will now be described below by reference to the attached Figures. The described exemplary embodiments are intended to assist the understanding of the invention and are not intended to limit the scope of the invention in any way. Like reference numerals refer to like elements throughout. The examples are provided in connection with a sports event by way of example only. The platform may be used with other events including the other types of events referenced herein and other types of events.

The 3D Digital Collectible

Aspects of various types of events may include important portions which can be captured (as digital media files or other forms of capture). Such digital media files may include videos, images, sounds, and or other forms of capture that record a particular event during an experience. For example, in relation to sports, an event can be a particular play, such as a dunk in a basketball game, a goal in a soccer match, or a catch in baseball. In such examples, the event may be captured as a video, audio and/or other form of highlight, including from one or more perspective views, as a digital media file or files. The event can be of different durations appropriate to memorialize the event. An event may be part of a live-action experience, such as a sporting match or play, or a scripted or pre-recorded experience, such as a movie.

In an exemplary embodiment, a 3D digital collectible may be defined, generated, and rendered. The 3D digital collectible may include a digital media file (e.g., a video highlight clip) or a set of digital media files (e.g., different perspectives of the same event or a series of files before, during and/or after the event) representing an event, along with data relating to the event. An event may include all or any identifiable portion of an experience.

The 3D digital collectible may be a virtual, three dimensional n-sided structure (where n is preferably greater than 3), where the n-surfaces may be configured to form an n-sided 3D shape, such as a cube, pyramid, octagon, or other 3D shape. One or more of the surfaces may display one or more digital media files, or portions of such digital media files, and/or one or more portions of data (or other content) in a defined relationship stored in memory such that a particular side may display a digital media file or files, or portions thereof, a portion or portions of data, other content or combinations thereof.

Figure 1B:
Figure 1C:
Figure 1D:
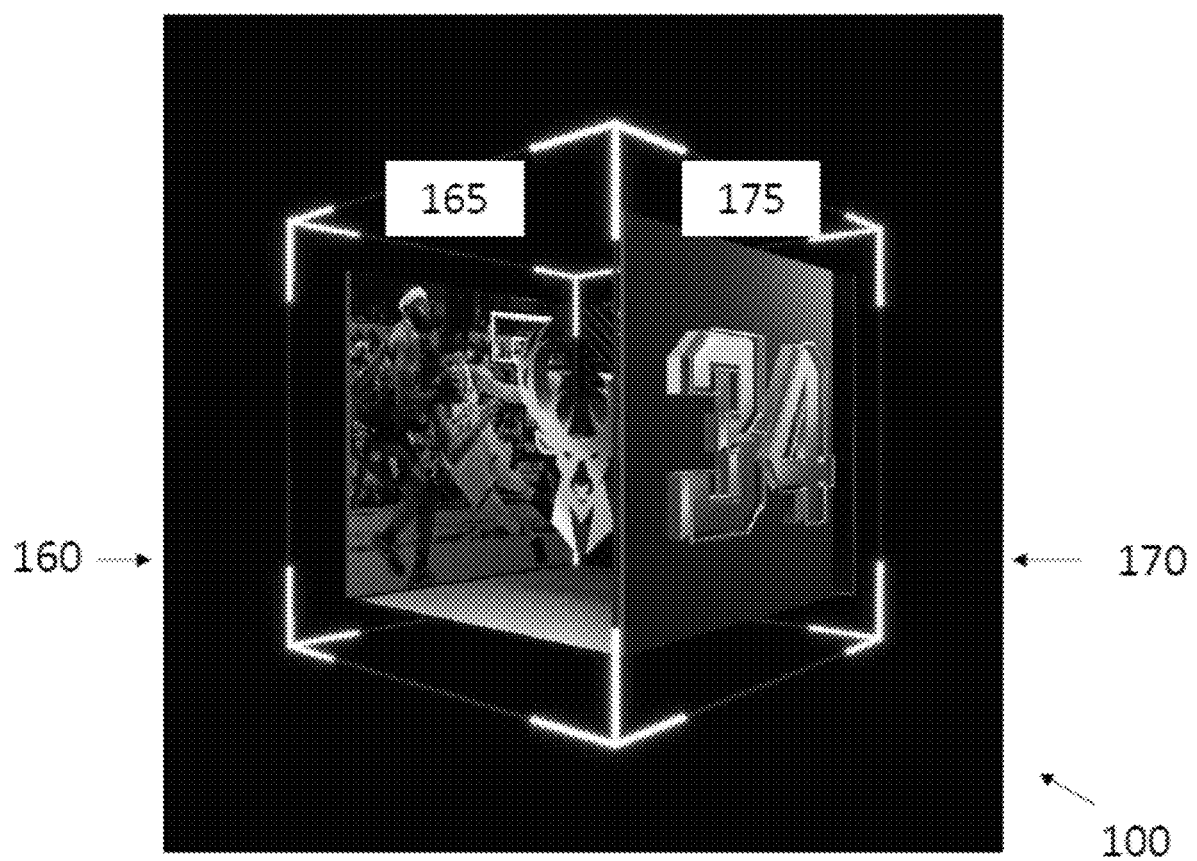
Figure 1E:

In the exemplary embodiment shown in FIG. 1a, a 3D digital collectible 100 is cube-shaped with six surfaces. In the perspective view of FIG. 1a, first surface 110 and second surface 120 are visible. First surface 110 has a digital media file 115, in this case a video clip. Second surface 120 has data 125, in this case the logo of the team of which a player in digital media file 115 is a member. FIGS. 1b-1e show further views of 3D digital collectible 100. In FIG. 1b, another surface of 3D digital collectible 100 is shown. Thus surface includes data, in this case a team logo and score related to the event to which the 3D collectible is related. In FIG. 1c, another surface of 3D digital collectible 100 is shown. This surface also includes data, in this case a team logo and a date and description of the event to which the 3D digital collectible is related. In FIG. 1d, another perspective view of 3D digital collectible 100 is shown. In this view, a surface 165 with different representation of a team logo is provided, such that it appears within collectible 100, along with a surface 175 with a number of the player shown in the video clip on surface 110. In this embodiment, the rear of surface 110 showing digital media file 115 may be seen through 3D digital collectible 100. In FIG. 1e, another surface of 3D digital collectible 100 with a team logo and copyright and system information is shown.

In various embodiments, the 3D digital collectible may be statically displayed in its virtual environment (e.g. on a computer display screen), or may be dynamically displayed, such that it is rotatable to display one or more of the surfaces and the associated content (e.g., a digital media file and/or data) assigned to that surface. Such dynamic display may be by way of interactions with a user, in response to a pre-defined movement or movements (e.g., via a script or other computer code), or combinations thereof.

The digital media file may be any type of media, including still images, video, audio, and/or other media, or combinations of such media. Digital media files may include a single view, audio track, or other recording, or composites of multiple views, audio tracks, or other recordings, such as a composite video showing different perspectives of the event, such as different camera views of a sports play or other event. The digital media files may also include multiple views, audio tracks, or other recordings of the event from different perspectives, times, or durations that may be played sequentially and/or in other order. Such sequential play can be implemented by user interactions with a list of the multiple views, audio tracks, or other recordings, by accessing the multiple views, audio tracks, or other recordings in accordance with a script, or by stitching together the multiple views, audio tracks, or other recordings into a single digital media file. In this regard the composite or sequential digital media files may include different types of files (e.g., they may include one or more of a video file, audio file, or other recording). Portions of a single digital media file may also be identified, separated, and used as individual digital media files in the manner described herein (e.g., a digital media file may be sequentially divided with different portions considered as different digital media files). For example, a single digital media file may be sequentially divided and provided on different surfaces of the 3D digital collectible.

The data relating to the event may include event data that describes the event itself. Using a sporting match as an example, event data may include such information as the player's name, the type of play (such as a dunk, block, or steal), the date and/or time of the event, and other event data. A second type of data may include actor data relating to the person captured in the event. Again using a sporting match as an example, actor data may include such information as the player's statistics, measurements, position, age, experience, hometown, college, draft selection, or other actor (or actors) data. A third type of data may include context data that describes additional information about the context of the event. Again using a sporting match as an example, context data may include the teams that are playing, the location of the game, the score of the game, the sports league, the sports season, and context data. The digital media file and any related data and/or other content may be collectively referred to as content.

Further exemplary embodiments of context data include information related to an entertainment experience from which the event is drawn, situational information related to the entertainment experience, the subject of the experience, and/or information related to the digital media file. For example, context data related to a sporting match may include the number of teams, the box score, game statistics, seasonal averages for the player, media about the game, and other context data. In the sporting match example, the context data may relate to one or more players or teams that are represented in a digital media file.

The various forms of data may be associated with a digital media file in any known manner, such as by tags, attributes, metadata, pointers and/or other associations. Data may be stored in a data structure in one or more databases. The data structures may link an event with media files, data, content and metadata. The event and/or digital media file can be searched based on information associated with the event or the digital media file.

Data may also include metadata. Metadata may include information specified in connection with the creation of the 3D digital collectible that specifies attributes of the digital collectible. The attributes may include the configuration of the digital collectible (e.g. the number of sides) the manner in which content should be displayed, such as what content should be displayed, where the content should be displayed (e.g., on which surface of the n-shape), and how the content should be displayed, including in relation to other content. Other attributes of the digital collectible may be used.

Metadata may also include information associated with the uniqueness or classification of the scarcity of the digital collectible. For example, a collectible may be a one of a kind instance of an event or there may be a predetermined number of instances or other methods for determining a number of instances. In any case, the digital collectible may be identified by a serial number or other unique value that uniquely identifies a particular 3D digital collectible, along with a unique identifier for the instance (e.g., 1 of 1 or 1 of 10, etc.) as necessary.

Scarcity may be represented by a classification based on the number of instances. For example, more than 1000 instances may be a first classification, 500-1000 may be another classification, 100-500 may be another classification, and so on. Other numbers may be used to categorize scarcity classifications. The uniqueness or scarcity (e.g., the number of instances) can be set for an individual 3D digital collectible as part of the initial creation process in defining the collectible. The metadata may include data that dictates how the 3D digital collectible is rendered for display based on the scarcity of the 3D digital collectible. For example, data relating to the uniqueness or scarcity of the 3D digital collectible can be displayed on the collectible, or other displayed features of the 3D digital collectible may relate to rarity or scarcity, such as the colors, shading, material, textures, lighting and/or visual display indicators that depict a scarcity classification.

The digital media file and data may also be created based on another digital media file or data. For example, a digital media file including a graphic and/or sound may be generated based on a digital media file including a video. As such, 3D digital collectibles can include one or more related digital media files and data.

System

Figure 4:
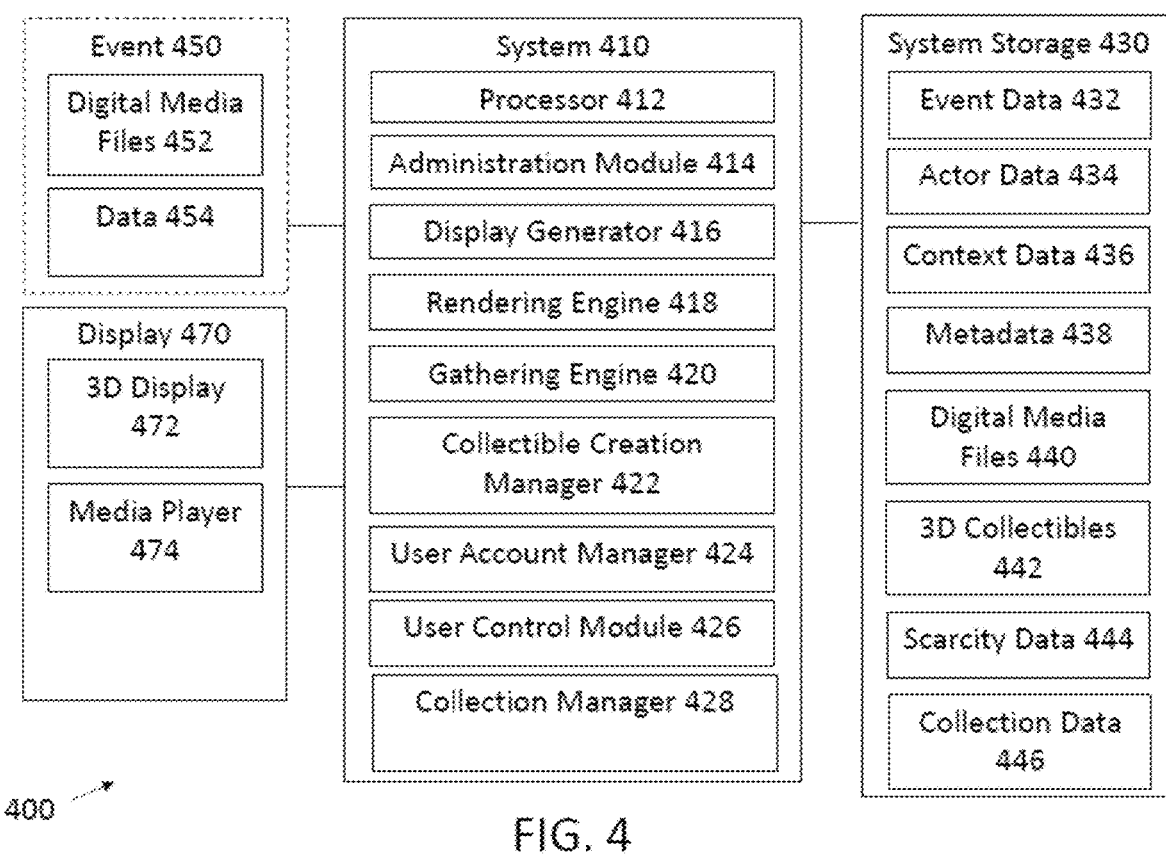
FIG. 4 shows aspects of a 3D digital collectible management system according to some embodiments of the invention.

A platform 400 for creating, generating, managing, storing, rendering, and displaying 3D digital collectibles according to an exemplary embodiment of the invention is shown in FIG. 4. FIG. 4 shows system 410 with various modules and engines for defining, generating, and rendering a 3D digital collectible, system storage 430 for storing data, digital media files, 3D collectibles, and collection information, and display 470 for displaying the 3D digital collectible to a user.

System 410 may include a computer server including a processor 412 programmed with computer instructions including an administration module 414, a display generator 416, a rendering engine 418, a gathering engine 420, a collectible creation manager 422, a user account manager 424, a user control module 426, and a collection manager 428. Platform 400 may also include a display 470 with 3D display 472 and media player 474. Platform 400 may also include an associated computer memory or system storage 430 that stores a data structure comprising event data 432, actor data 434, context data 436, metadata 438, digital media files 440. 3D collectibles 442, scarcity data 444, and collection data 446, associated data/content, and particular association(s) therebetween, including rules that define what is to be displayed on the surfaces of the 3D digital collectible. The components of the systems may be co-located or distributed.

Platform 400 may include tools to define and create a 3D digital collectible, and store and manage 35 digital collectibles, as described in more detail in a U.S. Patent Application filed Apr. 13, 2021 as U.S. patent application Ser. No. 17/229,455, titled "System And Method For Creating, Managing, And Displaying 3D Digital Collectibles," hereby incorporated by reference in its entirety.

Platform 400 may also include tools to display 3D digital collectibles, such as display generator 416 and rendering engine 418 for generating graphical user interfaces (GUIs) and rendering a 3D digital collectible for display therein to a user via 3D display 472 on display 470. For example, the 3D digital collectible (e.g. the digital media file and data) may be configured to be displayed as a 3D display element. The digital collectible can be represented as, or otherwise include, the 3D display element. The 3D display element can be in a virtual 3D graphical interface. The 3D display element can have n-surfaces which are combined together into an n-sided shape, (cube, sphere, pyramid, octagon, etc.). Each face or side of the of the n-sided shape can display at least one of the aforementioned digital media and/or data types. Each face or side of the n-sided shape can have associated digital media and/or context data of a specific type (for example, belonging to a specific classification of media, such as images, video, text, sound for playback, etc.).

The display generator 416 and rendering engine 618 may generate a GUI on display 470, the representation of the 3D digital collectible, and a media player for playing the digital media file(s) included with the 3D digital collectible based on scripted or user selected commands. The GUI may be configured to display the 3D digital collectible as the virtual, three dimensional n-sided structure discussed above. The display may be pre-rendered or rendered in real-time as it is being displayed. The 3D digital collectible may be rendered and displayed in any orientation, such as the perspective and plan views of FIGS. 1*a*-1*e*, may be stationary in one view, or may change orientation between views (e.g., rotate, translate, etc.) either automatically based on elapsed time, in reaction to a user interaction (e.g., mouse click, scroll bar movement, or touch interface), or both.

According to another exemplary embodiment, the GUI may be an interactive display. For example, in response to user input selections via the graphical user interface different surfaces of the n-sided display may be displayed. For example, as shown in FIGS. 2*a*-2*f*, GUI 250 may be configured to include a first display portion 200 with a set of icons and second display portion 220 to show various views of a 3D digital collectible.

In an interactive display, one or more of the icons may be user-selectable. In the exemplary embodiment of FIGS. 2*a*-2*f*, first display portion 200 includes six user-selectable icons 202, 204, 206, 208, 210, and 212, but more or fewer icons may be provided as discussed below.

In one embodiment, the number of icons are set in relation to the configuration of the 3D digital collectible being viewed (e.g., n icons are provided where the 3D digital collectible has n sides). In other embodiments, there may be more or fewer icons than the number of sides of the 3D Digital Collectible. In the embodiment shown in FIGS. 2*a*-2*f*, the 3D digital collectible is a cube shape, and six user-selectable icons 202, 204, 206, 208, 210 and 212 are provided in first display portion 200.

In one embodiment, each user-selectable icon has a specific relationship to a particular view of a 3D digital collectible as it is rendered by the GUI in the second display portion 220, as discussed below. For example, a particular user-selectable icon may relate to a plan view of a particular side of the 3D digital collectible, a perspective view of multiple sides of the 3D digital collectible at the same time, or any other applicable view of the 3D digital collectible. In one embodiment, an icon may include a description or image that correlates to a particular view of the 3D digital collectible. For example, the icon may include a thumbnail representation of the particular view (e.g., a thumbnail of a plan view of a surface of the 3D digital collectible or of a perspective view of multiple sides of the 3D digital collectible). In another embodiment, the icon may include a thumbnail representation of a picture the user has selected to display on the 3D digital collectible, such as to represent a digital media file. In another embodiment, the icons may provide a text description of the particular view to which it is related, or any other applicable symbol. In another embodiment, an icon may relate to a particular animation of the 3D digital collectible, such as a rotation or translation, or the launching of a media player as discussed below. In this instance, the icon may also include animation in a thumbnail configuration, or a related description or symbol indicating an animation or otherwise representative of the animation.

Any number of icons representing plan views, perspective views, animations, or mixtures thereof may be provided in various embodiments. In other words, the icons may all represent plan views, may all represent perspective views, may all represent animations, or may include mixtures of one or more of plan views, perspective views, and animations.

In the embodiment shown in FIGS. 2*a*-2*f*, the six user-selectable icons 202, 204, 206, 208, 210, and 212 each provide a thumbnail representation of a particular view of the related 3D digital collectible. Icons 202, 208, and 210 provide thumbnails of perspective views of the 3D digital collectible, whereas icons 204, 206, and 212 provide thumbnails of views of a particular surface of the 3D digital collectible.

As shown in FIGS. 2*a*-2*f*, not every side or view of the 3D digital collectible need be represented by an icon. In various embodiments, a single icon can show multiple sides, such as in perspective view or any other applicable manner. In other embodiments, two or more icons may be provided for a single side of the 3D digital collectible, such as to signify different portions of one side.

In other embodiments, icons may be provided that perform other actions related to the 3D digital collectible. For example, icons may change the appearance of the 3D digital collectible (e.g., changing the color, shading, or other format), launch viewers (such as described below), or other separate functions or objects, cause particular manipulations or animations of the 3D digital collectible to be implemented, change the present view of the 3D digital collectible in the second display portion 220 without selecting another icon (e.g., zooming, panning, rotating, etc.), or any other applicable action.

As discussed above, the second display portion 220 of GUI 250 is arranged in juxtaposition to the first display portion 200. Second display portion 220 is configured to display various views of the 3D digital collectible. As discussed above, the views may correspond to views associated with icons in first display portion 200, and may include additional views and functions.

Figure 2A:
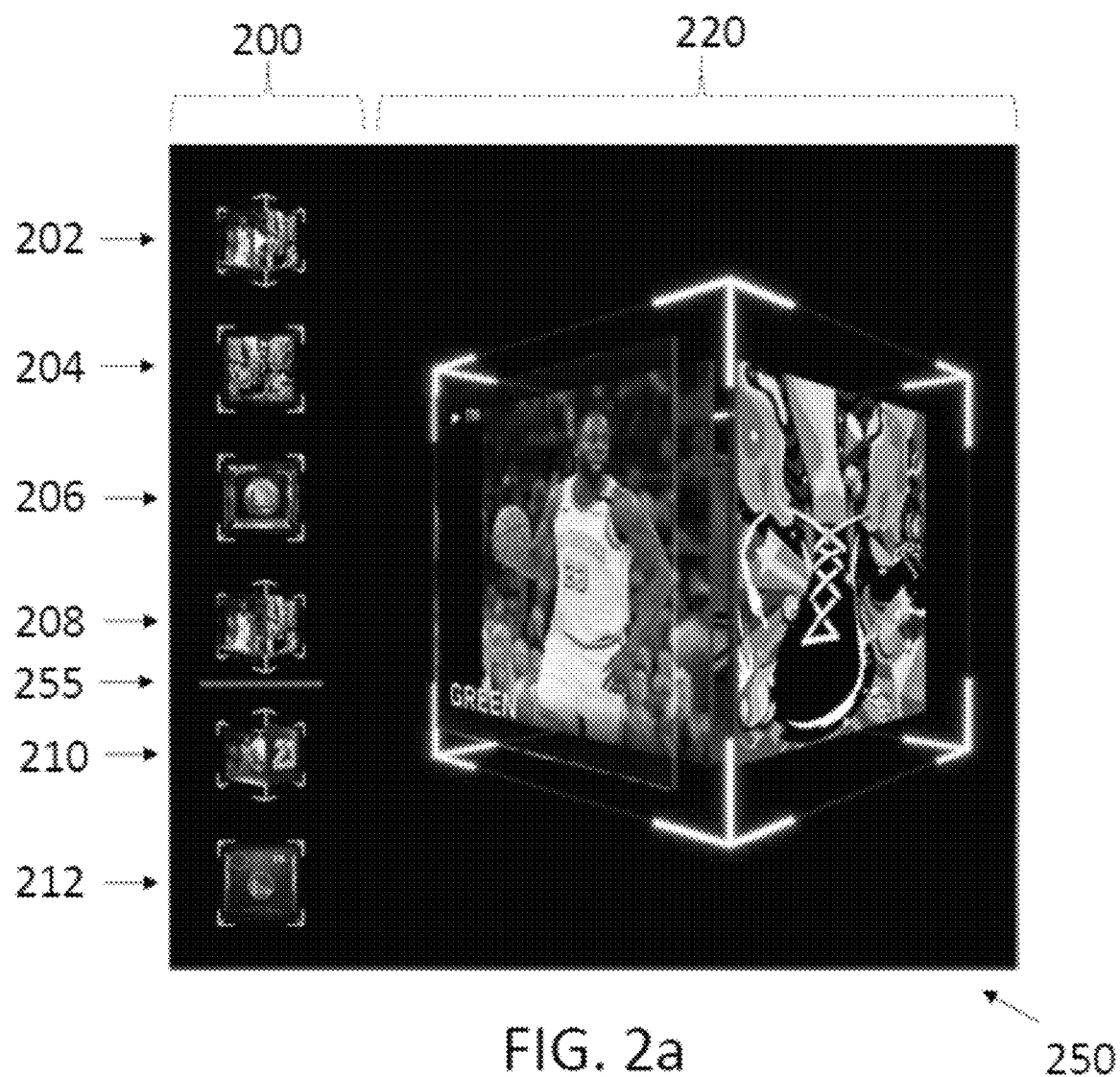
FIGS. 2a-2f show aspects of user controllable viewing tools according to some embodiments of the invention.

For example, as shown in FIG. 2*a*, second display portion 220 may show a perspective view of 3D digital collectible with a digital media file on one side and data on the other. This view may be activated in second display portion 220 by a user selecting icon 208. In some embodiments, the last icon selected by the user in first display portion 200 includes an indication that it has been selected. For example, in FIG. 2*a*, there is a horizontal indicator 255 arranged below icon 208 indicating that icon 208 was the last icon with which the user interacted. Any appropriate indication method may be utilized, such as color changes, opacity changes, icons (e.g., a checkmark).

Figure 2B:
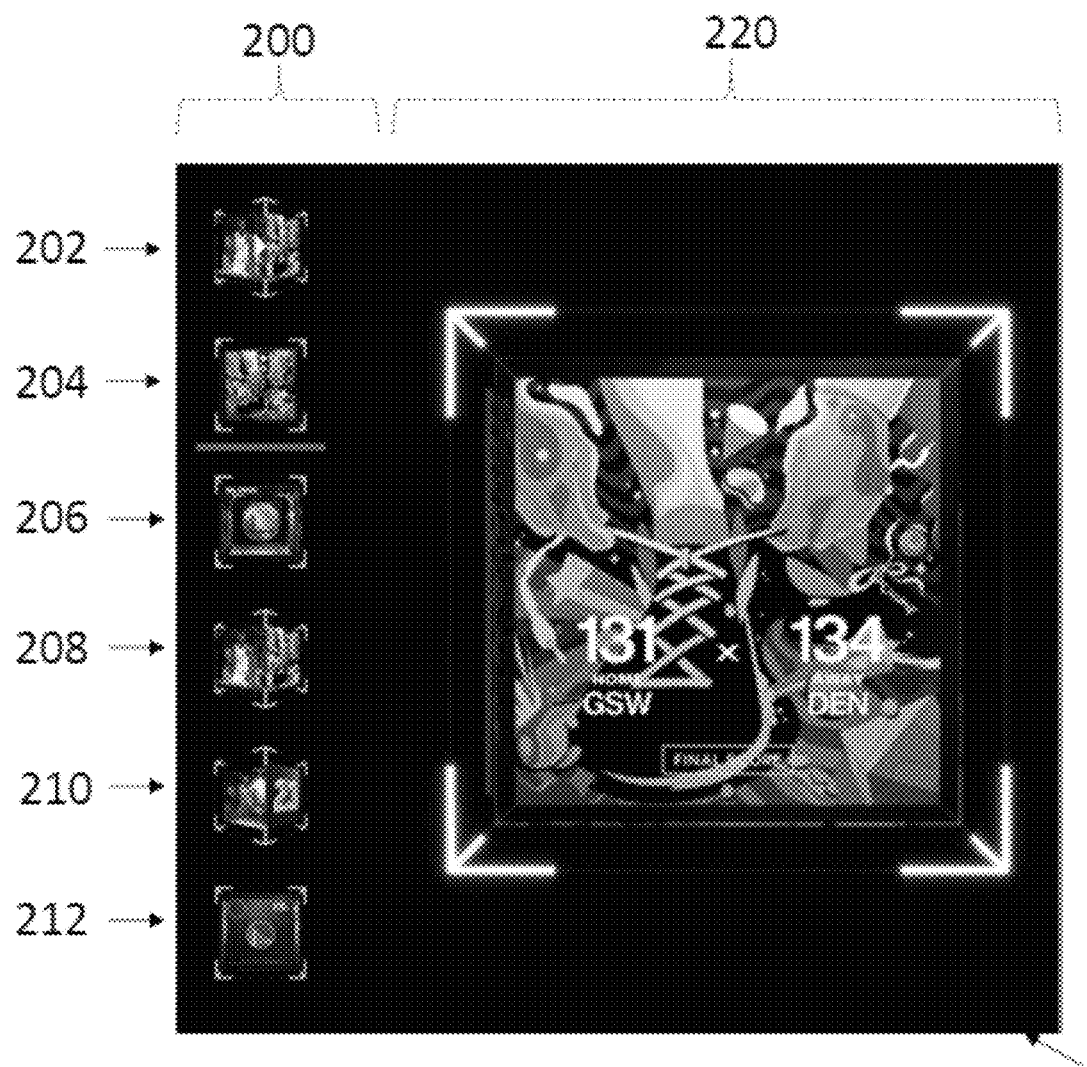
Figure 2C:
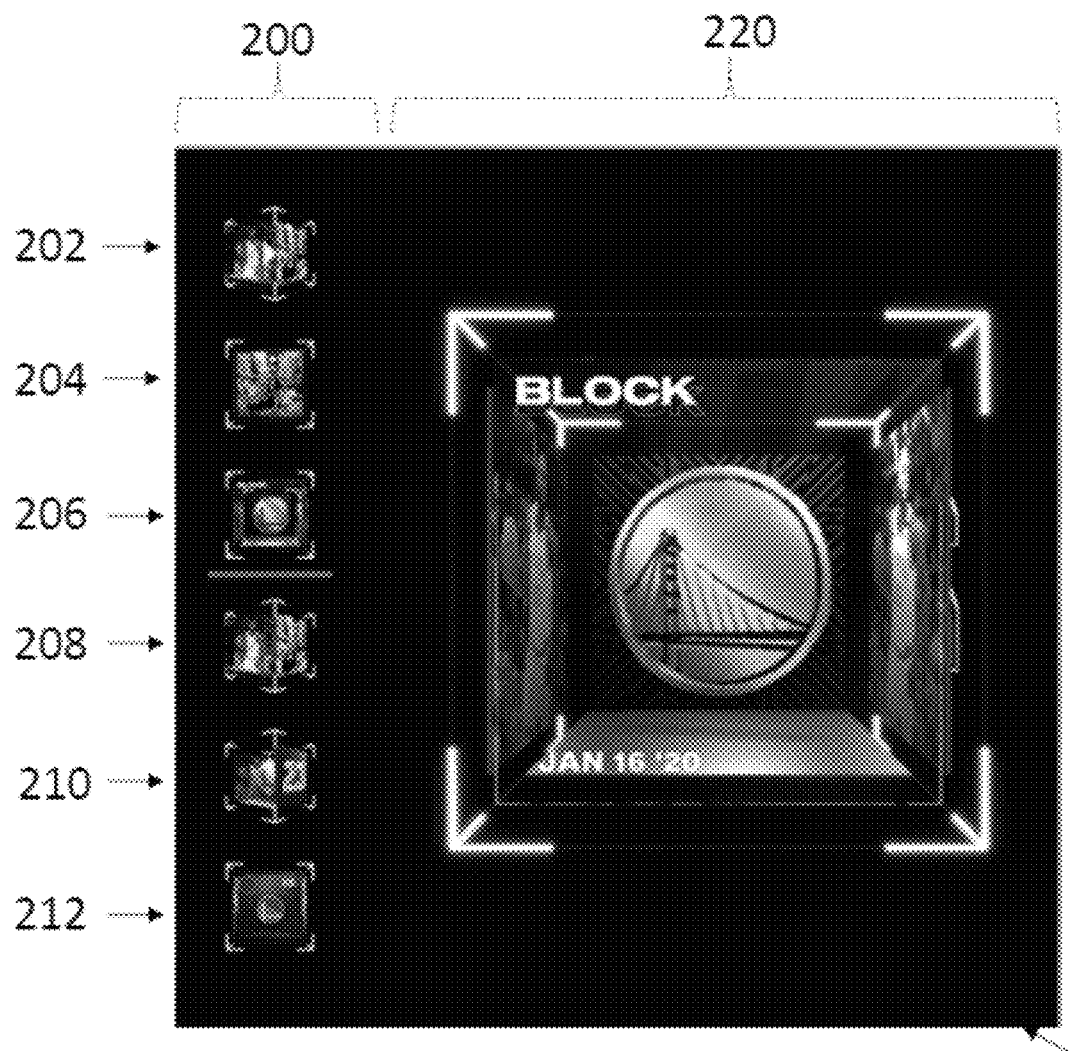
Figure 2D:
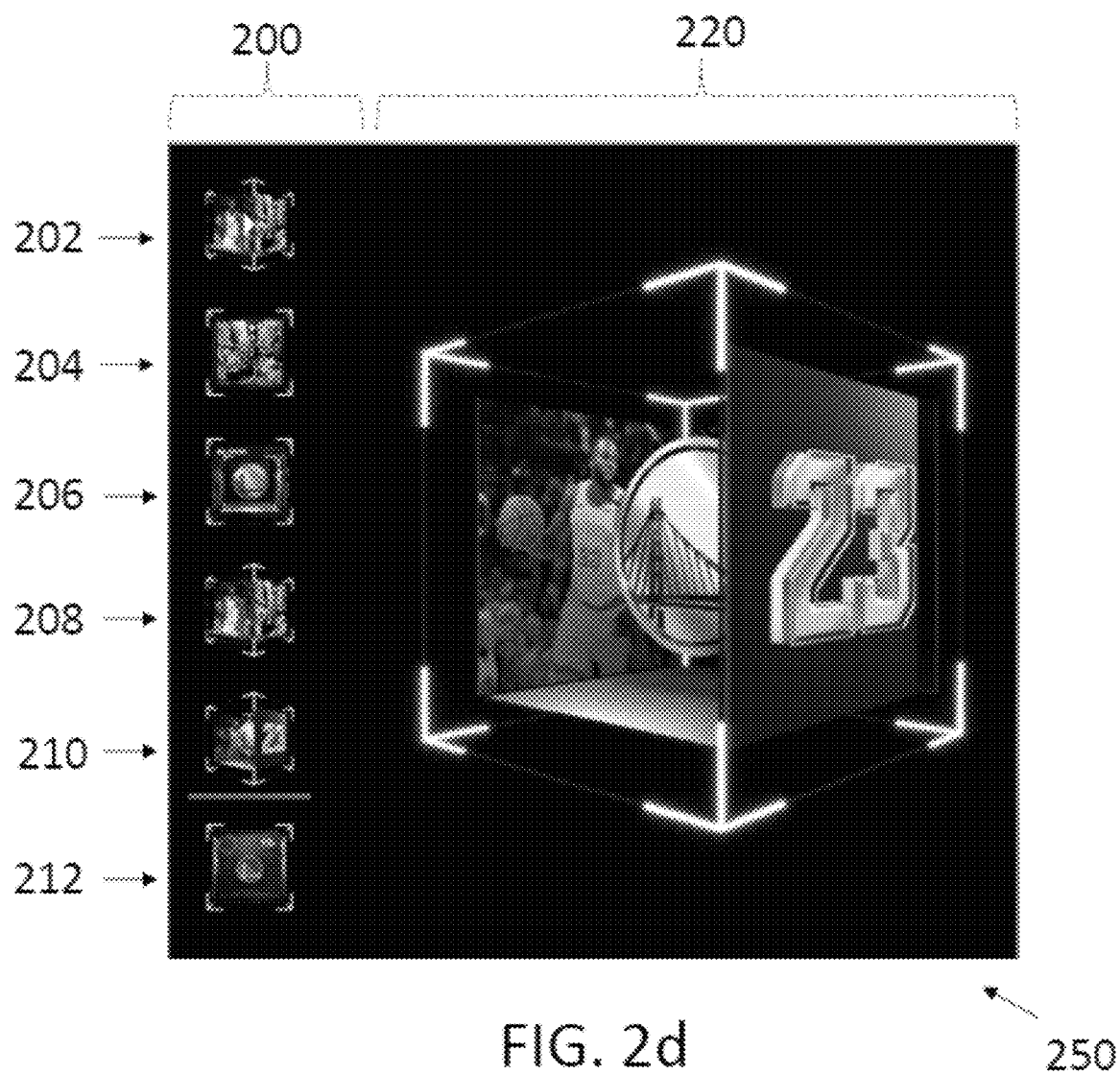
Figure 2E:
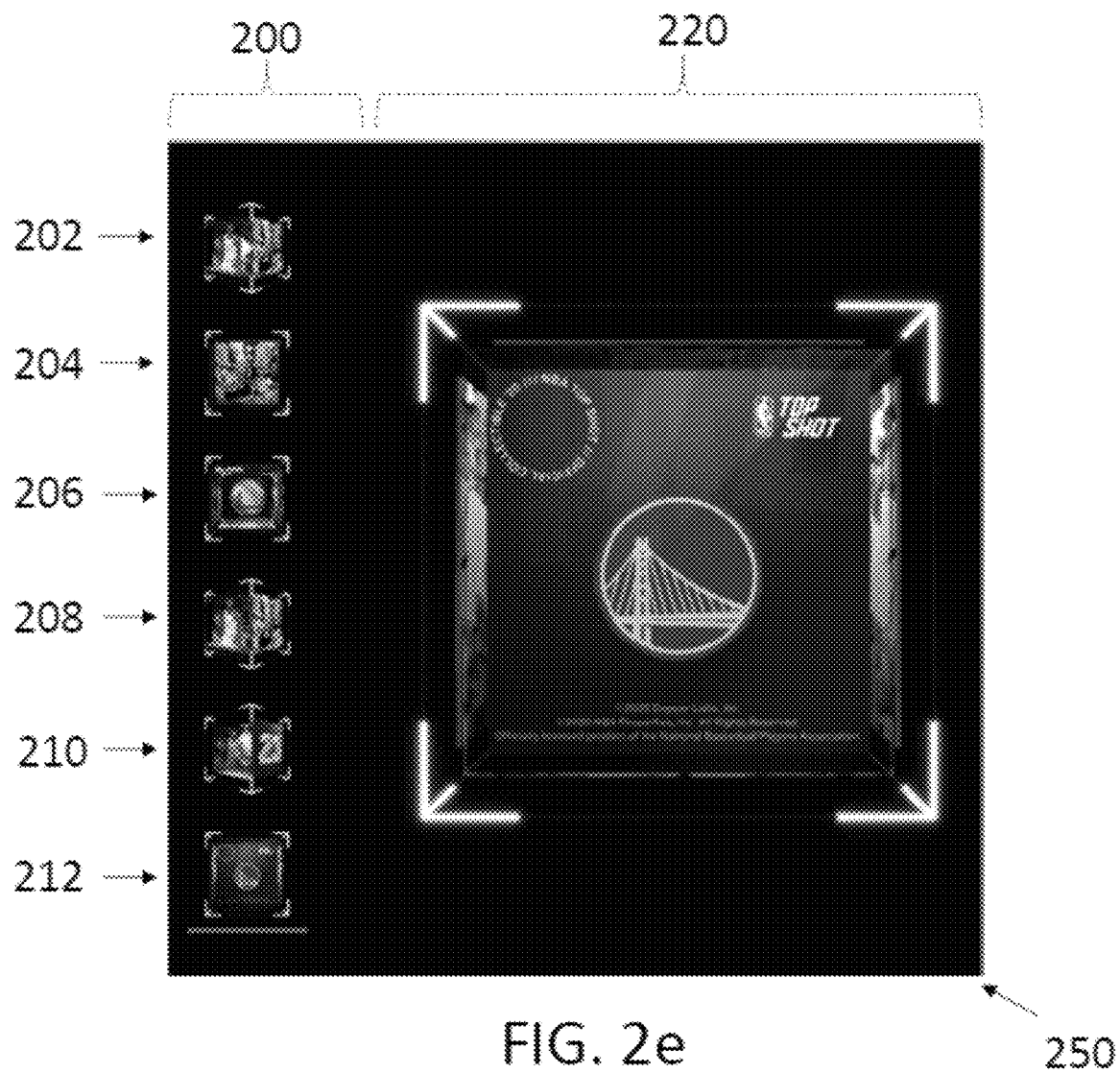

In FIG. 2*b*, second display portion 220 may show a plan view of surface of 3D digital collectible with a logo and score related to the event to which the 3D collectible is related. This view may be activated in second display portion 220 by a user selecting icon 204. In FIG. 2*c*, second display portion 220 may show a plan view of another surface of 3D digital collectible with a team logo and a date and description of the event to which the 3D digital collectible is related. This view may be activated in second display portion 220 by a user selecting icon 206. In FIG. 2*d*, second display portion 220 may show another perspective view of 3D digital collectible with a player number on one surface and another surface rendered transparently. This view may be activated in second display portion 220 by a user selecting icon 210. In FIG. 2*e*, second display portion 220 may show a plan view of another surface of 3D digital collectible with a team logo and copyright and system information. This view may be activated in second display portion 220 by a user selecting icon 212.

In these embodiments, selecting individual icons may simply display the related particular view of the 3D digital collectible in second display portion 220. Alternatively, selection of an icon may result in the 3D digital collectible digitally moving to the corresponding side (e.g., by rotation, translation, etc.). Any other appropriate transition between one view of the 3D digital collectible and another in second display portion 220 may also be utilized, such as fading or other cinematic effects.

Additionally, in these embodiments, when a surface is shown in second display portion 220 that includes a digital media file, the digital media may be displayed on that surface. For example, in FIG. 2a, a digital media file is visible. If the digital media file is a video and/or audio track, display of the surface containing that digital media file in display portion 220 also allows the video or audio to play. For example, in FIG. 2a, if the displayed digital media file is a video, it may play in the orientation shown. In various embodiments, the video or audio may play automatically when the particular view including that file is selected, or a control (such as a play button) may be provided for user selection. Such a control may be placed on the surface where the digital media file is shown, or may be arranged adjacent the surface or anywhere else in the GUI 200.

Figure 2F:
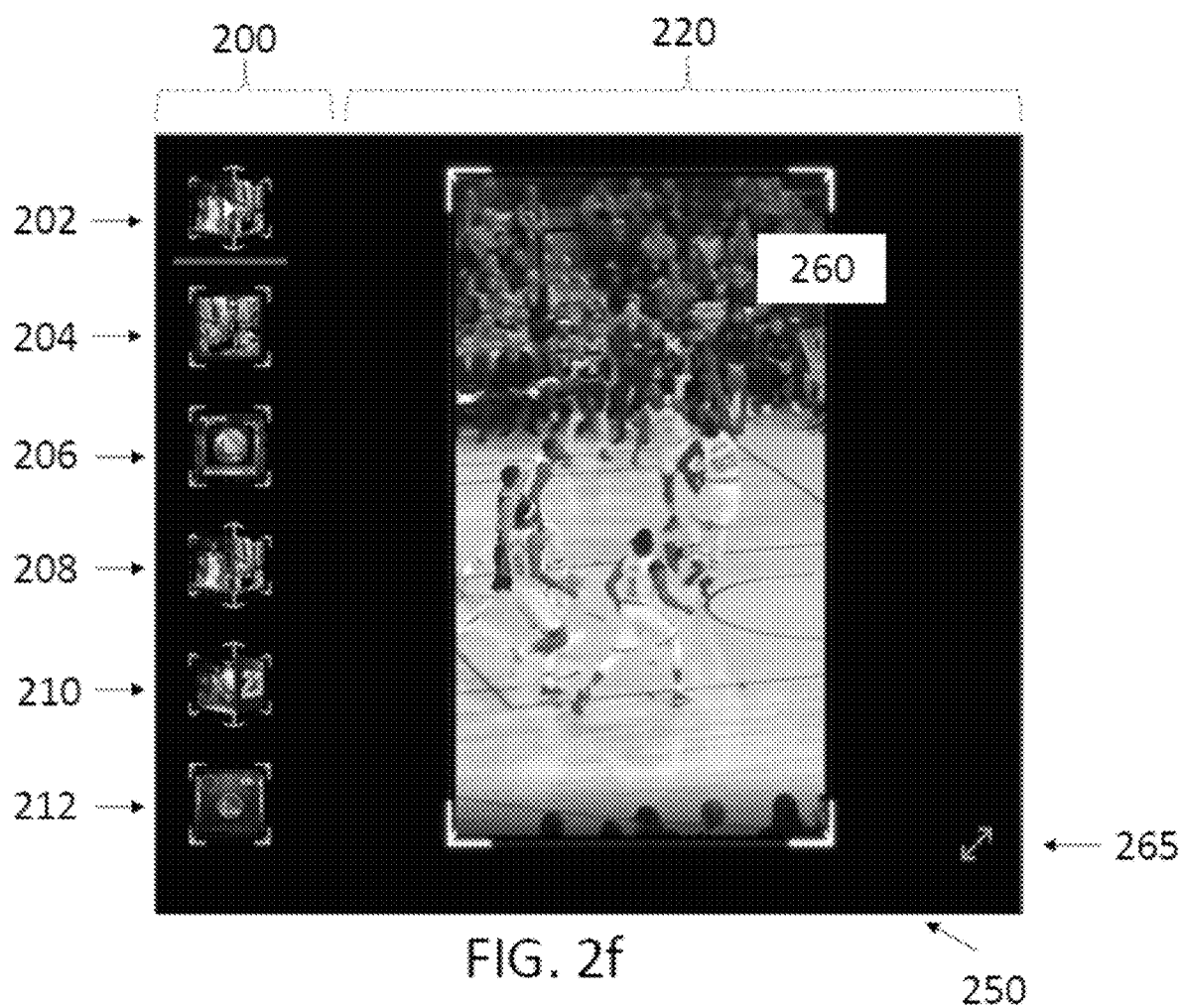

In other embodiments, second display portion 220 may also play digital media files and/or data from surfaces of the 3D digital collectible in a separate media player, such as in an window or pop-up adjacent to the 3D digital collectible. The media player may also partially or fully overlay the 3D digital collectible, hover over a surface of the 3D digital collectible, or simply replace the 3D digital collectible in second display portion 220. A media player 260 according to one embodiment is shown in FIG. 2f, which is activated in second display portion 220 by a user selecting icon 202. The media player may automatically launch and begin playing after the user selects a related icon, or may play after user interaction in the manner discussed above. The media player may be of any shape and orientation to play the media file, including the portrait orientation shown in FIG. 2f. Additionally, the view of the media player can be changed by further user interaction. For example, in the embodiment shown in FIG. 2f, selector 265 is provided that, when clicked, causes the media player to be maximized on the user screen for easier viewing. Selectors may also be provided to perform other display changes, or to launch a separate viewer or application.

Figure 3A:
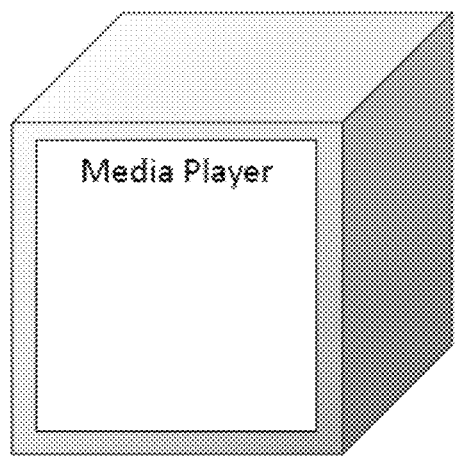
FIGS. 3a and 3b show a digital media playing applications according to some embodiments of the invention.
Figure 3B:
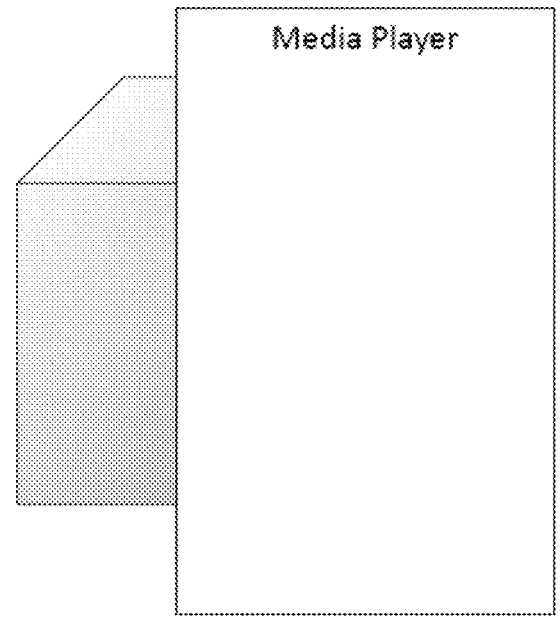

FIGS. 3A and 3B illustrates other exemplary embodiments of the media player. FIG. 3A provides the media player over the surface of the 3D digital collectible, while FIG. 3B shows the media player partially overlaying the 3D digital collectible. In either of these embodiments, the 3D digital collectible and media player may be provided in second display portion 220, or in a separate window or popup. In any of the embodiments discussed above, the media player may be partially transparent such that portions of the 3D digital collectible under the media player are still visible.

In the embodiments discussed above related to playing digital media files included with the 3D digital collectible, the icon related to the view including the digital media file may include an indication that the related view includes a digital media file that may be played. For example, icon 202 in FIG. 2a includes a triangular symbol similar to a "play" button in GUIs. This symbol indicates to a user that the particular view of 3D digital collectible related to that icon includes a digital media file that may be played, such as is shown in FIG. 2f.

In any of the video playing embodiments discussed above, if a digital media file includes a video or audio clip, the video or audio can be configured to play in any of the above manners. Various playback features may also be implemented in any of the above embodiments to allow the user more control of the playback, such as play, pause, rewind, and replay buttons.

Video or audio may also be configured to play automatically after a related icon in first display portion 200 is selected by a user (e.g., according to timing or positioning of the 3D digital collectible), or upon a request. If the 3D digital collectible includes multiple digital media files, the multiple files may also be configured to play sequentially, either automatically or pursuant to user selection.

Managing a Collection of 3D Digital Collectibles

According to other aspects of various embodiments, a user may manage the display of multiple digital collectables within their account through collection manager 428. For example, in some embodiments, the digital collectables may be stored online (e.g., under control of the system), a user may create one or more collections of digital collectables and share a link or other identifier associated with the collection and other users may use the link or other identifier to view the collection(s). Data related to the collection may be stored as collection data 446.

In various embodiments, individual 3D digital collectibles may be gathered into collections. Collections may be organized by the owner of the collectibles, the management system, or both. For example, an owner of a plurality of 3D digital collectibles (as maintained by administration module 414) may select two or more of the collectibles to be part of a collection via collection manager 428 (e.g., by using a GUI). The 3D digital collectibles may be grouped by user preference or any other related data (e.g., location, time, player, etc.), manually or automatically, as discussed below.

To facilitate the management of collections, the system may provide a set of graphical user interfaces on display 470 via display generator 416, rendering engine 418, and collection manager 428. A first graphical user interface may include collection creation display that enables a user to select a set of the user's collectables to include in the collection, name the collection and upon completion click an icon to share the collection. The first graphical user interface may include a first display portion, that when selected by a user causes a second graphical user interface or second display portion (collectively "second display element") that includes a template to facilitate the ability for a user to select the desired digital collectables and arrange them in a desired order. The second display element may include a graphical depiction or layout of a predetermined number of slots for receiving digital collectables so that a user can select a collectable for one or more slots, such as from a pop-up list activated by interaction with a slot, drag and drop, or any other selection method, and specify an order. Once the user selects the desired digital collectables and arranges them in a desired order, the user may select save or otherwise indicate that they are finished making selections. The user may then be returned to the first graphical user interface and click an icon to share the collection via one or more predetermined channels and/or otherwise share a link or other identifier to enable others to view the collection(s).

The user may create, separately name and share multiple collections with different collectables and/or combinations thereof.

System 410 may include a collection manager 428 that comprises computer code for generating the displays described herein, cause the user's selection of collectables and the specified order to be stored in memory in association with a collection name and/or store other information relation to a collection, such as in collection data 446. The collections manager 428 may also include computer code that s configured to display a collection to a second user when the second user selects the link or other identifier associated with a first user's collection.

Figure 5A:
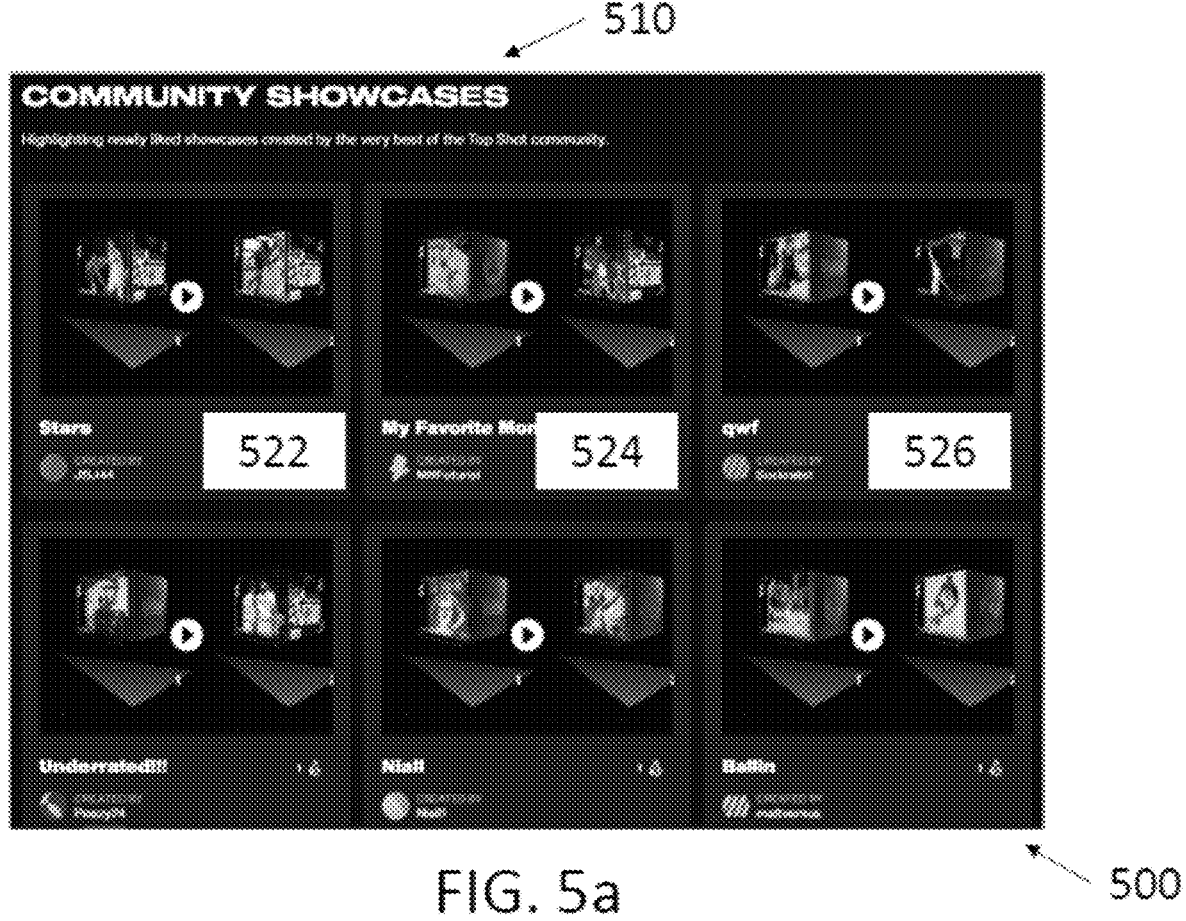
FIGS. 5a-5c show aspects of viewing tools for a collection of 3D digital collectibles according to some embodiments of the invention.

According to one embodiment, collections of 3D digital collectibles may be displayed for other users to view, such as is shown in FIG. 5*a*. In the FIG. 5*a* embodiment, a GUI 500 displays showcase 510 that includes collection representations 522, 524, and 526 of individual collections of 3D digital collectibles in a grid. In other embodiments, the collection representations may be displayed as a text list, tabs, or any other applicable format allowing a user to view and select a particular collection. Collections may be named for identification purposes and displayed in the collection representations as shown in the embodiment of FIG. 5*a*. Collections may also be identified by the creator of the collection, or the owner of the 3D digital collectibles in the collection, and displayed in the collection representations as shown in the embodiment of FIG. 5*a*. Other appropriate collection identifiers may be displayed in the collection representations to indicate the contents of the collection, including data drawn from the member 3D digital collectibles. For example, if all of the member 3D digital collectibles relate to a single player or team, that may be displayed in the collection representations.

Figure 5B:
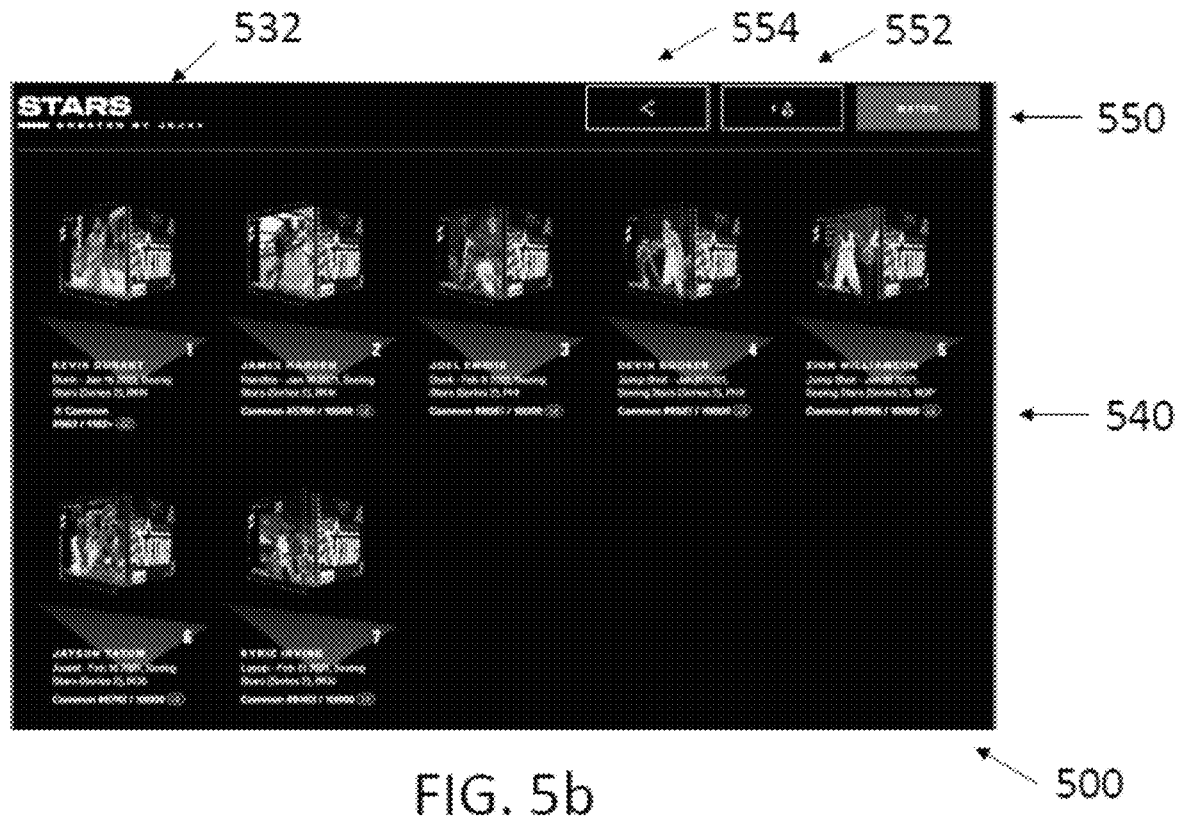

In one embodiment, a user may select one of the collections to view its contents. For example, a user may select collection representation 522, which will result in the GUI displaying collection 532 in collection display interface 540 as shown in FIG. 5*b*. Collection 532 includes seven (or other number of) individual 3D digital collectibles, as shown in FIG. 5*b*. GUI 500 may display the individual 3D digital collectibles of collection 532 in any manner. In the FIG. 5*b* embodiment, each individual 3D digital collectible is shown in a grid in a perspective view with a digital media file on one surface and data on the second, but the 3D digital collectibles may be shown in any orientation, including any of the orientations discussed above. Individual 3D digital collectibles may be arranged in a common orientation in collections, or different orientations. The individual 3D digital collectibles may also be arranged in a list or other arrangement that allows a user to view the contents of collection 532.

In an embodiment, collection display interface 540 may also include link creation button 554 for a user to create a link to collection 532 to allow other users to view collection 532, and rating button 552, which allows a user to rate or rank collection 532. Other buttons, links, or interfaces may be provided.

According to an embodiment, a user may also select one of the 3D digital collectibles in collection 532 shown in collection display interface 540 as shown in FIG. 5*b*. The GUI will then display the 3D digital collectible and allow user interaction in the manner shown in FIGS. 2*a*-2*f*, as discussed above.

Figure 5C:
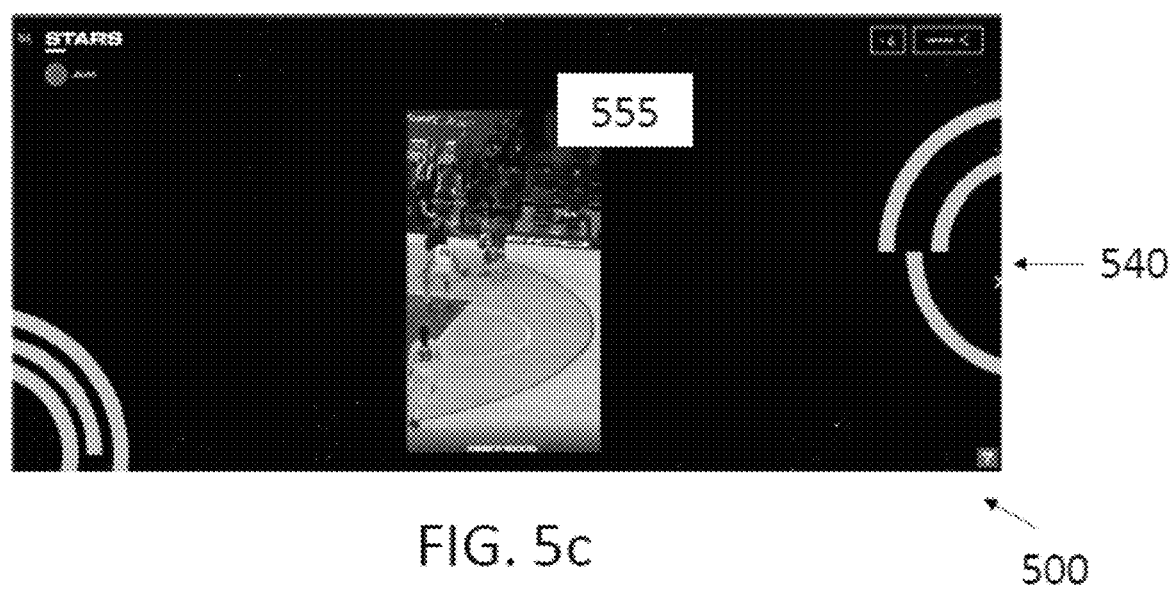

According to another embodiment, a user may request that the digital media files included in the 3D digital collectibles of collection 532 be played in a media player or separate window or pop-up. For example, a user may select the watch button 550 in the FIG. 5*b* embodiment, which may launch a media player 555 in GUI 500 and collection display interface 540 as shown in FIG. 5*c*. Media player 555 is similar to media player 260, and may be implemented in the manner discussed above regarding media player 260.

In an embodiment, media player 555 plays each of the digital media files in the 3D digital collectibles of collection 532 in a continuous serial loop, either by sequentially playing the individual digital media files or by stitching together the individual digital media files into one file. In other embodiments, GUI may provide the user options to play particular digital media files, such as by showing individual links or icons, and may allow the user to control the playback in the manner discussed above regarding media player 260.

In another embodiment, after a user selects watch button 550 in FIG. 5*b*, the collection display interface 540 may sequentially display 3D digital collectibles and their respective digital media files. For example, collection display interface 540 may display a first 3D digital collectible of collection 532, automatically play a digital media file from the first 3D digital collectible, then display a second 3D digital collectible of collection 532 and automatically play a digital media file from the second 3D digital collectible, and so on until each 3D digital collectible and digital media file has been displayed in collection display interface 540.

In another embodiment, a collection may itself include multiple collections of 3D digital collectibles. In such an embodiment, collections may be displayed in an intervening screen of GUI 500 between FIGS. 5*a* and 5*b* in a similar format. For example, the individual 3D digital collectibles in FIG. 5*b* may themselves be sub-collections of 3D digital collectibles, which a user may select to access individual 3D digital collectibles in the manner discussed above in a further GUI screen similar to FIG. 5*b*. Alternatively, sub-collections may be denoted in collection display interface 540 of GUI 500 in FIG. 5*b* by other visual cues, such as shading, highlights, boxes surrounding the individual 3D digital collectibles of a sub-collection.

Collections may also be created, modified, and deleted according to various embodiments. For example, an owner of 3D digital collectibles may manage multiple collections of his 3D digital collectibles in his user account, and may create, modify, or delete collections, including specifying which of his 3D digital collectibles are part of a particular collection. Collections may also be created, modified, and deleted by other users or by a manager of system 400.

Figure 6A:
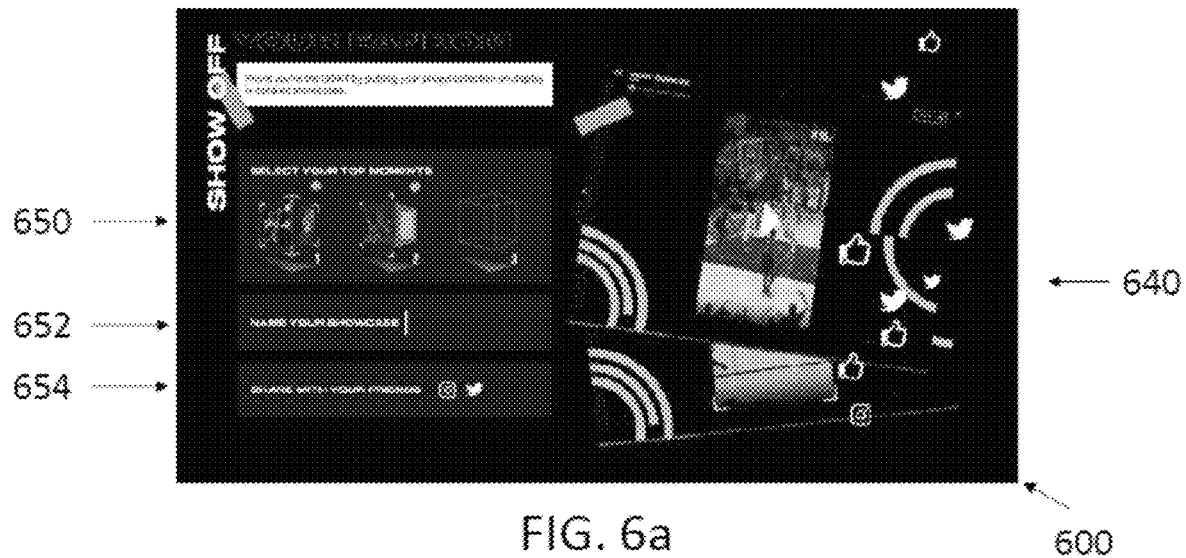
FIGS. 6a-6b shows aspects of tools for building a collection of 3D digital collectibles.
Figure 6B:
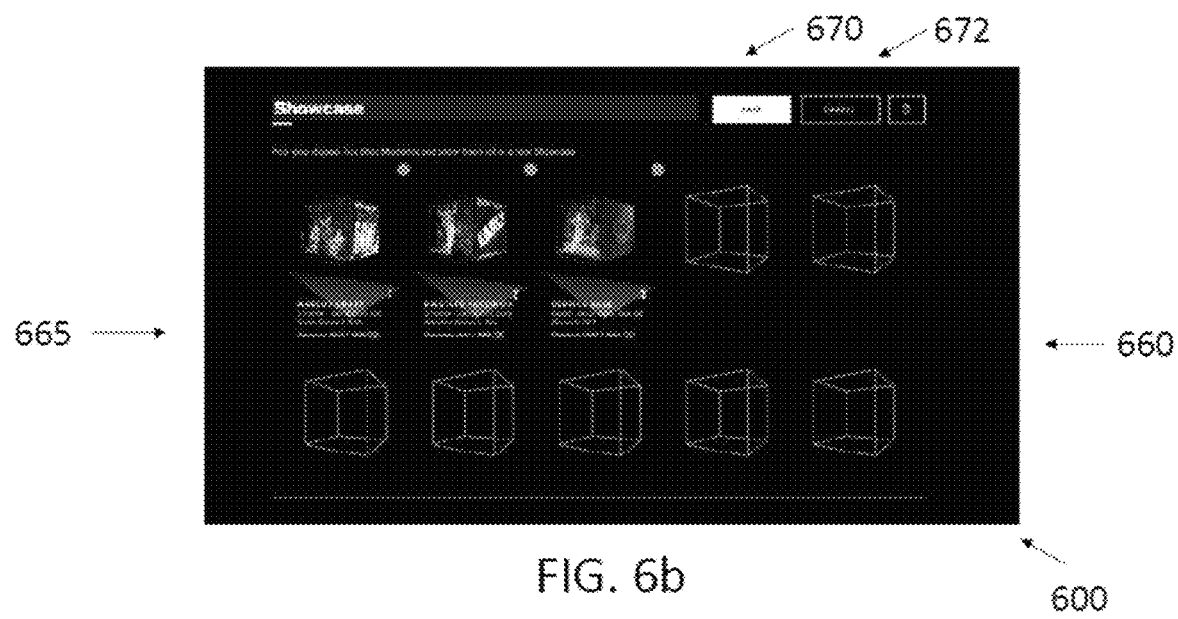

An exemplary collection creation and management system is illustrated by the GUI 600 shown in FIGS. 6*a* and 6*b*. In one embodiment, FIG. 6*a* shows GUI 600 with collection creation interface 640, which allows a user to create a collection. Collection creation interface 640 may provide name entry area 652, where a user to enter a name of the collection, sharing interface area 654, which a user may select to share the collection with friends via, for example, an email link or social media, and 3D digital collectible selection area 650, where a user may select which 3D digital collectibles to include in the collection. Selecting any of the areas 650, 652, or 654 may cause a popup or other window to appear to allow appropriate selection of information or information entry. For example, selecting name entry area 652 may open a text entry box. Alternatively selecting name entry area may simply active a cursor in name entry area for typing. Alternatively, the system may provide suggested names based on selected 3D digital collectibles in the collection, the user's information, past history, or the like. In another example, selecting sharing interface area 654 may open a popup providing sharing options, an e-mail interface, access to a user's social media, or the like.

Regarding 3D digital collectible selection area 650, in an exemplary embodiment, user selection of this area may bring up a list of 3D digital collectibles that may be added to the collection. Thumbnails or other representations of the individual 3D digital collectibles may also be provided to the user to facilitate identification and selection of 3D digital collectibles to add to the collection.

In another embodiment, a collection management interface 660 may be accessed by user selection of the 3D digital collectible selection area 650. An example of such a collection management interface 660 in GUI 600 is shown in FIG. 6b. In an embodiment, collection management interface 660 may include template 665, which sets the framework for a collection. In such an example, a user may arrange individual 3D digital collectibles in template 665, which represents how the 3D digital collectibles will be shown to other users (e.g., such as is shown in FIG. 5b) and sets an order in which related digital media files in the respective 3D digital collectibles are played, as discussed above regarding FIG. 5c. In this exemplary embodiment, the framework is provided as cube icons upon which a user may place a 3D digital collectible, but other framework indicators may be used. Users may select individual 3D digital collectibles to place in each location of the framework via a list of available 3D digital collectibles provided in a pop-up or other selectable interface, or thumbnails or other representations as discussed above. Once a user has placed the 3D digital collectibles in template 665 as desired, the user may select the save button 670 (or the cancel button 672 if the changes are not desired to be saved). At this time, the collection manager 428 will store the collection and an identification of its constituent 3D digital collectibles as a relationship in collection data 446. The user may then return to collection creation interface 640, as shown in FIG. 6a, and finalize creation of the collection, name the collection, or share the collection as described above.

A user may modify or delete existing collections using either or both of the interfaces of FIGS. 6a and 6b. A user may also maintain multiple separate collections of his 3D digital collectibles. Different collections may include the same or separate 3D digital collectibles.

In the above embodiments, collections, such as collections 432, may be managed by collection manager 428 by reference to collection data 446. Collection manager 432 may define the 3D digital collectibles that are part of collection 432, uniquely identify collection 432, relate collection 432 to a particular user, maintain the underlying relationships and data structures, and access related data stored in collection data 446. Collections 432 may also be displayed to a user as a GUI 500 in a manner similar to GUI 250 discussed above. For example, GUI 500 may provide collection display interface 540, individual 3D digital collectibles, and media player 555 in display 470 on 3D display 472 and media player 474 using rendering engine 418 and display generator 416 in the manner discussed above regarding GUI 250. GUI 600 may also provide collection creation interface 640 and collection management interface 660 in display 470 in a similar manner. Collections manager also receives and implements the user selections discussed above to create and manage individual collections, and to build a data structure to maintain the collections.

In some embodiments, when a second user selects the link or other identifier associated with a first user's collection, the collections management module generates a collectables display interface. The collections management module may display the collection, including each of the digital collectables included in the collection. According to one option, the second user may select individual ones of the digital collectables for display. According to another option, the collections management module may instruct a media player to automatically play, in the collectables display interface, the media files of the digital collectables included in the collection. The collections management module may be configured via software to cause the digital media files of the digital collectables included in the collection to be automatically displayed sequentially or may stitch the files together to create a single media file including each of the digital media files of the digital collectables included in the collection.

According to other aspects of some embodiments, the collections management module may cause the collectables display interface to sequentially display each of the digital collectibles and then the media files of the digital collectables included in the collection.

Processing Devices and Processors

In some embodiments, the platforms, systems, media, and methods described herein, including system 400, include a processing devices, processors, or use of the same. In further embodiments, the processing device includes one or more hardware central processing units (CPUs) or general purpose graphics processing units (GPUs) that carry out the device's functions. In still further embodiments, the processing device further comprises an operating system configured to perform executable instructions. In some embodiments, the processing device is optionally connected a computer network. In further embodiments, the processing device is optionally connected to the Internet such that it accesses the World Wide Web. In still further embodiments, the processing device is optionally connected to a cloud computing infrastructure. In other embodiments, the processing device is optionally connected to an intranet. In other embodiments, the processing device is optionally connected to a data storage device. In accordance with the description herein, suitable processing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers. In some embodiments, the processing device includes an operating system configured to perform executable instructions. The operating system is, for example, software, including programs and data, which manages the device's hardware and provides services for execution of applications. Those of skill in the art will recognize that suitable server operating systems include, by way of nonlimiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft Windows Phone® OS, Microsoft Windows Mobile® OS, Linux®, and Palm® WebOS®. In some embodiments, the processing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the processing device is not powered. In further embodiments, the non-volatile memory comprises flash memory. In some embodiments, the nonvolatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein. In some embodiments, the processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active matrix OLED (AMOLED) display. In some embodiments, the processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In still further embodiments, the input device is a combination of devices such as those disclosed herein.

Referring to FIG. 4, in an exemplary platform 400, an exemplary system 410 is programmed or otherwise configured to, for example, dynamically load data provider connector modules and/or request, procure, process, analyze, persist and/or provide one or more data records. In this embodiment, the system 410 includes a processor 412 (also known as a central processing unit (CPU), and "computer processor"), which can be a single core or multi core processor, or a plurality of processors for parallel processing. System 410 also includes memory or memory location (e.g., random-access memory, read-only memory, flash memory), system storage 430 (e.g., hard disk), a communication interface (e.g., network adapter) for communicating with one or more other systems, and peripheral devices, such as cache, other memory, data storage and/or electronic display adapters. The memory, system storage 430, network interface and peripheral devices are in communication with the CPU 412 through a communication bus, such as a motherboard. The system storage 430 can be a data storage unit (or data repository) for storing data. System 410 can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, server clusters and/or distributed computing resources, providing, for example cloud computing. The network, in some cases with the aid of the system 410, can implement a peer-to-peer network, which may enable devices coupled to the device 501 to behave as a client or a server.

In some embodiments, the CPU 412 can execute a sequence of machine-readable instructions, which can be embodied in a program or software. The instructions may be stored in a memory location, such as the memory. The instructions can be directed to the CPU 412, which can subsequently program or otherwise configure the CPU 412 to implement methods of the present disclosure. The CPU 412 can be part of a circuit, such as an integrated circuit. One or more other components of the system 410 can be included in the circuit. In some cases, the circuit is an application specific integrated circuit (ASIC) or a field programmable gate array (FPGA).

In some embodiments, the system storage 430 can store files such as drivers, libraries and saved programs. The system storage 430 can store user data, e.g., user preferences and user programs. The system 410 in some cases can include one or more additional data storage units that are external, such as located on a remote server, remote server cluster, network attached storage, or the like, that is in communication through an intranet or the Internet. In some embodiments, methods as described herein can be implemented by way of machine (e.g., computer processor) executable code stored on an electronic storage location of the system 410, such as, for example, on the memory or system storage 430. The machine executable or machine readable code can be provided in the form of software. During use, the code can be executed by CPU 412. In some cases, the code can be retrieved from the system storage 430515 and stored on the memory for ready access by the CPU 412. In some situations, the system storage 430 can be precluded, and machine-executable instructions are stored on memory. In some embodiments, the code is pre-compiled. In some embodiments, the code is compiled during runtime. The code can be supplied in a programming language that can be selected to enable the code to execute in a precompiled or as-compiled fashion.

In some embodiments, the system 410 can include or be in communication with an electronic display 470. In some embodiments, the electronic display 470 provides a user interface or GUI.

Non-Transitory Computer Readable Storage Medium

In some embodiments, the platforms, systems, media, and methods disclosed herein include one or more non-transitory computer readable storage media encoded with a program including instructions executable by the operating system of an optionally networked processing device. In further embodiments, a computer readable storage medium is a tangible component of a processing device. In still further embodiments, a computer readable storage medium is optionally removable from a processing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the processing device's CPU, written to perform one or more specified tasks. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages. The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Web Application In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language OiML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of nonlimiting examples, Adobe® Flash®, HTML 5, Apple® QuickTime®, Microsoft® Silverlight®, Java™, and Unity®.

Mobile Application

In some embodiments, a computer program includes a mobile application provided to a mobile processing device. In some embodiments, the mobile application is provided to a mobile processing device at the time it is manufactured. In other embodiments, the mobile application is provided to a mobile processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB .NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, Mobi-Flex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of nonlimiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of data, such as digital media collectibles described herein. In various embodiments, suitable databases include, by way of non-limiting examples, relational databases, nonrelational databases, object oriented databases, object databases, entity-relationship model databases, associative databases, and XML databases. In some embodiments, a database is web-based. In still further embodiments, a database is cloud computing-based. In other embodiments, a database is based on one or more local computer storage devices.

Various methods have been described herein to generate, maintain, and display 3D digital collectibles, including methods using exemplary steps. It may be understood that more or less steps may be included, and that the illustrated steps are merely non-limiting examples. Nor is the order in which the steps are presented/described indicative of any set or requisite order that must be followed. It should be appreciated that various prompts, cues, buttons, and/or other graphical/visual interactive elements may be presented to the user together with one or more of these steps. Steps depicted herein may correspond to instructions stored in computer readable storage medium which can be executed by one or more processors of computing components described herein, for example as part of computing components disclosed herein While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A computer system for displaying a collection of a plurality of separate 3D virtual display elements on a graphical user interface, the separate 3D virtual display elements representing digital collectables and comprising n-surfaces, where n is a number greater than 3, and content including at least a representation of a digital media file on a first surface of the n-surfaces and data relating to the digital media file on a second surface of the n-surfaces, comprising:
    at least one processor;
    a computer-readable storage medium having instructions stored thereupon which are executable by the at least one processor and which, when executed, cause the computing system to:
    generate, according to a stored set of rules, a first graphical user interface display comprising a collection representation display interface displaying a plurality of representations of collections of a plurality of separate 3D virtual display elements;
    generate, in response to selection of a first representation of a first collection of a plurality of separate 3D virtual display elements of the displayed plurality of separate representations of collections of a plurality of separate 3D virtual display elements, a second graphical user interface display comprising a collection display interface, said collection display interface displaying the plurality of separate 3D virtual display elements of the first collection of a plurality of separate 3D virtual display elements simultaneously in a predetermined arrangement; and
    generate the plurality of 3D virtual display elements in the collection display interface in the predetermined arrangement such that the plurality of separate 3D virtual display elements are simultaneously visible and positioned such that first surfaces of the plurality of separate 3D virtual display elements comprising at least the representation of the digital media files are simultaneously visible,
    wherein the first representation of the first collection of a plurality of separate 3D virtual display elements comprises a label indicating a scarcity level of at least one of the plurality of separate 3D virtual display elements of the first collection.

2. The system of claim 1, the instructions further cause the computing system to:
    generate, in response to the selection of a first 3D virtual display element of the plurality of 3D virtual display elements of the first collection of a plurality of 3D virtual display elements in the collection display interface and according to a stored second set of rules, a third graphical user interface display comprising a first display portion and a second display portion, the first display portion configured to display the first 3D virtual display element, the second display portion displaying a set of n icons, each representing a depiction of at least one of the n-surfaces of the first 3D virtual display element; and
    in response to a selection of a first one of the icons in the second display portion associated with a first surface of the n-surfaces, cause the first display portion to display the first surface of the first 3D virtual display element and the representation of the digital media file associated with the first surface.

3. The system of claim 1, wherein the representation of the digital media files of the plurality of 3D virtual display elements of the first collection of a plurality of 3D virtual display elements displayed in the collection display interface relate to video files, and the instructions further cause the computing system to:
    generate, as part of the collection display interface, a watch button; and
    activate, in response to selection of the watch button, a media player to automatically play the video files related to the representations of digital media files of the plurality of 3D virtual display elements displayed in the collection display interface serially in a first order set by the predetermined arrangement of the plurality of 3D virtual display elements.

4. The system of claim 1, wherein the separate 3D virtual display elements comprise separate three-dimensional shapes comprising the n-surfaces.

5. The system of claim 1, wherein the first representation of the first collection of a plurality of separate 3D virtual display elements comprises a label describing one or more of the plurality of separate 3D virtual display elements of the first collection.

6. The system of claim 1, wherein the first representation of the first collection of a plurality of separate 3D virtual display elements comprises a label indicating the owner of the plurality of separate 3D virtual display elements of the first collection.

7. The system of claim 1, wherein the predetermined arrangement is a grid with a plurality of rows and columns.

8. The system of claim 1, wherein the predetermined arrangement is defined by the owner of the digital collectibles represented by the plurality of separate 3D virtual display elements making up the first collection.

9. The system of claim 1, wherein the plurality of generated 3D virtual display elements in the predetermined arrangement are positioned such that both the first surfaces of the plurality of separate 3D virtual display elements comprising the representation of the digital media files and the second surfaces of the plurality of separate 3D virtual display comprising the data related to the digital media files are simultaneously at least partially visible.

10. The system of claim 3, wherein the media player is configured to play the video files of the plurality of 3D virtual display elements in a continuous serial loop.

11. The system of claim 3, wherein, when the media player is activated to automatically play the video files related to the representations of digital media files of the plurality of 3D virtual display elements displayed in the collection display interface, the instructions further cause the computing system to:
   highlight a first 3D virtual display element of the plurality of separate 3D virtual display elements in the predetermined arrangement, the first 3D virtual display element comprising a first representation of a first video;
   play the first video;
   highlight a second 3D virtual display element of the plurality of separate 3D virtual display elements in the predetermined arrangement, the second 3D virtual display element comprising a second representation of a second video; and
   play the second video.

12. The system of claim 1, further comprising an administrative module comprising a display with display options to configure the 3D virtual display elements and specify related rules, files, and data, wherein the computing system is further caused to: configure the 3D virtual display elements including the number of n-surfaces; and apply a set of rules for each 3D virtual display element specifying the representations of digital media files and data to be displayed on particular surfaces of the 3D virtual display elements.

13. A computer system for displaying collections of 3D virtual display elements on a graphical user interface, comprising:
   at least one processor;
   a computer-readable storage medium having instructions stored thereupon which are executable by the at least one processor and which, when executed, cause the computing system to:
   store, in the computer-readable storage medium, a configuration of a first 3D virtual display element, representing a first digital collectible, comprising a 3D shape with a first surface comprising at least a representation of a first digital media file and a second surface comprising first data relating to the first digital media file, and first scarcity data classifying the scarcity level of the first digital collectible based on the number of instances of the digital collectible, the first 3D virtual display element being of a first scarcity level;
   store, in the computer-readable storage medium, a configuration of a second 3D virtual display element, representing a second digital collectible, comprising a 3D shape with a first surface comprising at least a representation of a second digital media file and a second surface comprising second data relating to the second digital media file;
   store, in the computer-readable storage medium, a configuration of a third 3D virtual display element, representing a third digital collectible, comprising a 3D shape with a first surface comprising at least a representation of a third digital media file and a second surface comprising third data relating to the third digital media file;
   store, in the computer-readable storage medium, a configuration of a fourth 3D virtual display element, representing a fourth digital collectible, comprising a 3D shape with a first surface comprising at least a representation of a fourth digital media file and a second surface comprising fourth data relating to the fourth digital media file;
   wherein the first, second, third, and fourth 3D virtual display elements are separate 3D shapes, and the first, second, third, and fourth media files are each different;
   store, in the computer-readable storage medium, information defining a first collection of 3D virtual display elements comprising the first and second 3D virtual display elements;
   store, in the computer-readable storage medium, information defining a second collection of 3D virtual display elements comprising the third and fourth 3D virtual display elements;
   generate, according to a stored set of rules, a first graphical user interface display comprising a collection representation display interface displaying a first representation of the first collection of 3D virtual display elements and a second representation of the second collection of 3D virtual display elements, wherein the first and second representations are separate;
   generating, on the first representation of the first collection of 3D virtual display elements a first visual indication that the first collection of 3D virtual display elements includes the first digital collectible of the first scarcity level, the first visual indication visually distinguishing the first representation of the first collection of 3D virtual display elements from the second representation of the second collection of 3D virtual display elements;
   generate, in response to selection of the first representation, a second graphical user interface display comprising a collection display interface, said collection display interface displaying the first and second 3D virtual display elements simultaneously and separately in a predetermined arrangement; and
   generate the first and second 3D virtual display elements in the collection display interface in the predetermined arrangement such that the representation of the first digital media file and first surface of the first 3D virtual display element and the representation of the second digital media file and first surface of the second 3D virtual display element are simultaneously at least partially visible.

14. A computer system for displaying a collection of a plurality of separate 3D virtual display elements on a graphical user interface, the separate 3D virtual display elements representing digital collectables and comprising n-surfaces, where n is a number greater than 3, and content including at least a representation of a digital media file on a first surface of the n-surfaces and data relating to the digital media file on a second surface of the n-surfaces, comprising:
   at least one processor;

a computer-readable storage medium having instructions stored thereupon which are executable by the at least one processor and which, when executed, cause the computing system to:

generate, according to a stored set of rules, a first graphical user interface display comprising a collection representation display interface displaying a plurality of representations of collections of a plurality of separate 3D virtual display elements;

generate, in response to selection of a first representation of a first collection of a plurality of separate 3D virtual display elements of the displayed plurality of separate representations of collections of a plurality of separate 3D virtual display elements, a second graphical user interface display comprising a collection display interface, said collection display interface displaying the plurality of separate 3D virtual display elements of the first collection of a plurality of separate 3D virtual display elements simultaneously in a predetermined arrangement;

generate the plurality of 3D virtual display elements in the collection display interface in the predetermined arrangement such that the plurality of separate 3D virtual display elements are simultaneously visible and positioned such that first surfaces of the plurality of separate 3D virtual display elements comprising at least the representation of the digital media files are simultaneously visible, wherein the representation of the digital media files of the plurality of 3D virtual display elements of the first collection of a plurality of 3D virtual display elements displayed in the collection display interface relate to video files;

generate, as part of the collection display interface, a watch button; and activate, in response to selection of the watch button, a media player to automatically play the video files related to the representations of digital media files of the plurality of 3D virtual display elements displayed in the collection display interface serially in a first order set by the predetermined arrangement of the plurality of 3D virtual display elements, wherein, when the media player is activated to automatically play the video files related to the representations of digital media files of the plurality of 3D virtual display elements displayed in the collection display interface, the instructions further cause the computing system to:

highlight a first 3D virtual display element of the plurality of separate 3D virtual display elements in the predetermined arrangement, the first 3D virtual display element comprising a first representation of a first video;

play the first video;

highlight a second 3D virtual display element of the plurality of separate 3D virtual display elements in the predetermined arrangement, the second 3D virtual display element comprising a second representation of a second video; and play the second video.

15. The system of claim 14, wherein the separate 3D virtual display elements comprise separate three-dimensional shapes comprising the n-surfaces.

16. The system of claim 14, wherein the first representation of the first collection of a plurality of separate 3D virtual display elements comprises a label describing one or more of the plurality of separate 3D virtual display elements of the first collection.

17. The system of claim 14, wherein the first representation of the first collection of a plurality of separate 3D virtual display elements comprises a label indicating the owner of the plurality of separate 3D virtual display elements of the first collection.

18. The system of claim 14, wherein the first representation of the first collection of a plurality of separate 3D virtual display elements comprises a label indicating the scarcity level of at least one of plurality of separate 3D virtual display elements of the first collection.

19. The system of claim 14, wherein the predetermined arrangement is a grid with a plurality of rows and columns.

20. The system of claim 14, wherein the predetermined arrangement is defined by the owner of the digital collectibles represented by the plurality of separate 3D virtual display elements making up the first collection.

21. The system of claim 14, wherein the plurality of generated 3D virtual display elements in the predetermined arrangement are positioned such that both the first surfaces of the plurality of separate 3D virtual display elements comprising the representation of the digital media files and the second surfaces of the plurality of separate 3D virtual display comprising the data related to the digital media files are simultaneously at least partially visible.

22. The system of claim 14, wherein the media player is configured to play the video files of the plurality of 3D virtual display elements in a continuous serial loop.

23. The system of claim 14, further comprising an administrative module comprising a display with display options to configure the 3D virtual display elements and specify related rules, files, and data, wherein the computing system is further caused to: configure the 3D virtual display elements including the number of n-surfaces; and apply a set of rules for each 3D virtual display element specifying the representations of digital media files and data to be displayed on particular surfaces of the 3D virtual display elements.

24. A computer system for displaying a collection of a plurality of separate 3D virtual display elements on a graphical user interface, the separate 3D virtual display elements representing digital collectables and comprising n-surfaces, where n is a number greater than 3, and content including at least a representation of a digital media file on a first surface of the n-surfaces and data relating to the digital media file on a second surface of the n-surfaces, comprising:

at least one processor;

a computer-readable storage medium having instructions stored thereupon which are executable by the at least one processor and which, when executed, cause the computing system to:

generate, according to a stored set of rules, a first graphical user interface display comprising a collection representation display interface displaying a plurality of representations of collections of a plurality of separate 3D virtual display elements;

generate, in response to selection of a first representation of a first collection of a plurality of separate 3D virtual display elements of the displayed plurality of separate representations of collections of a plurality of separate 3D virtual display elements, a second graphical user interface display comprising a collection display interface, said collection display interface displaying the plurality of separate 3D virtual display elements of the first collection of a plurality of separate 3D virtual display elements simultaneously in a predetermined arrangement; and generate the plurality of 3D virtual display elements in the collection display interface in the predetermined arrangement such that the plurality of separate 3D virtual display elements are simultaneously visible and positioned such that first surfaces of the plurality of separate 3D virtual display elements comprising at least the representation of the digital media files are simultaneously visible, the system further comprising an administrative module comprising a display with display options to configure the 3D virtual display elements and specify related rules, files, and data, wherein the computing system is further caused to: configure the 3D virtual display elements including the number of n-surfaces; and apply a set of rules for each 3D virtual display element specifying the representations of digital media files and data to be displayed on particular surfaces of the 3D virtual display elements.

25. The system of claim 24, the instructions further cause the computing system to:

generate, in response to the selection of a first 3D virtual display element of the plurality of 3D virtual display elements of the first collection of a plurality of 3D virtual display elements in the collection display interface and according to a stored second set of rules, a third graphical user interface display comprising a first display portion and a second display portion, the first display portion configured to display the first 3D virtual display element, the second display portion displaying a set of n icons, each representing a depiction of at least one of the n-surfaces of the first 3D virtual display element; and in response to a selection of a first one of the icons in the second display portion associated with a first surface of the n-surfaces, cause the first display portion to display the first surface of the first 3D virtual display element and the representation of the digital media file associated with the first surface.

26. The system of claim 24, wherein the representation of the digital media files of the plurality of 3D virtual display elements of the first collection of a plurality of 3D virtual display elements displayed in the collection display interface relate to video files, and the instructions further cause the computing system to:

generate, as part of the collection display interface, a watch button; and activate, in response to selection of the watch button, a media player to automatically play the video files related to the representations of digital media files of the plurality of 3D virtual display elements displayed in the collection display interface serially in a first order set by the predetermined arrangement of the plurality of 3D virtual display elements.

27. The system of claim 24, wherein the separate 3D virtual display elements comprise separate three-dimensional shapes comprising the n-surfaces.

28. The system of claim 24, wherein the first representation of the first collection of a plurality of separate 3D virtual display elements comprises a label describing one or more of the plurality of separate 3D virtual display elements of the first collection.

29. The system of claim 24, wherein the first representation of the first collection of a plurality of separate 3D virtual display elements comprises a label indicating the owner of the plurality of separate 3D virtual display elements of the first collection.

30. The system of claim 24, wherein the first representation of the first collection of a plurality of separate 3D virtual display elements comprises a label indicating the scarcity level of at least one of plurality of separate 3D virtual display elements of the first collection.

31. The system of claim 24, wherein the predetermined arrangement is a grid with a plurality of rows and columns.

32. The system of claim 24, wherein the predetermined arrangement is defined by the owner of the digital collectibles represented by the plurality of separate 3D virtual display elements making up the first collection.

33. The system of claim 24, wherein the plurality of generated 3D virtual display elements in the predetermined arrangement are positioned such that both the first surfaces of the plurality of separate 3D virtual display elements comprising the representation of the digital media files and the second surfaces of the plurality of separate 3D virtual display comprising the data related to the digital media files are simultaneously at least partially visible.

34. The system of claim 26, wherein the media player is configured to play the video files of the plurality of 3D virtual display elements in a continuous serial loop.

35. The system of claim 26, wherein, when the media player is activated to automatically play the video files related to the representations of digital media files of the plurality of 3D virtual display elements displayed in the collection display interface, the instructions further cause the computing system to:

highlight a first 3D virtual display element of the plurality of separate 3D virtual display elements in the predetermined arrangement, the first 3D virtual display element comprising a first representation of a first video;

play the first video;

highlight a second 3D virtual display element of the plurality of separate 3D virtual display elements in the predetermined arrangement, the second 3D virtual display element comprising a second representation of a second video; and play the second video.

* * * * *